(12) United States Patent
Banerjee et al.

(10) Patent No.: US 11,990,613 B2
(45) Date of Patent: May 21, 2024

(54) ELECTROCHEMICAL STORAGE INCORPORATING SIZE- AND MORPHOLOGY-CONTROLLED METASTABLE VANADIUM PENTOXIDE AS A CATHODE MATERIAL FOR ION BATTERIES

(71) Applicant: THE TEXAS A&M UNIVERSITY SYSTEM, College Station, TX (US)

(72) Inventors: Sarbajit Banerjee, College Station, TX (US); Justin L. Andrews, College Station, TX (US); Abhishek Parija, College Station, TX (US); Luis R. De Jesus Baez, Philadelphia, PA (US)

(73) Assignee: THE TEXAS A&M UNIVERSITY SYSTEM, College Station, TX (US)

( * ) Notice: Subject to any disclaimer, the term of this patent is extended or adjusted under 35 U.S.C. 154(b) by 404 days.

Patent file contains an affidavit/declaration under 37 CFR 1.130(b).

(21) Appl. No.: 16/956,761

(22) PCT Filed: Dec. 21, 2018

(86) PCT No.: PCT/US2018/067392
§ 371 (c)(1),
(2) Date: Jun. 22, 2020

(87) PCT Pub. No.: WO2019/126808
PCT Pub. Date: Jun. 27, 2019

(65) Prior Publication Data
US 2020/0321613 A1 Oct. 8, 2020

Related U.S. Application Data

(60) Provisional application No. 62/609,220, filed on Dec. 21, 2017.

(51) Int. Cl.
H01M 4/48 (2010.01)
C01G 31/02 (2006.01)
(Continued)

(52) U.S. Cl.
CPC ............ *H01M 4/483* (2013.01); *C01G 31/02* (2013.01); *H01M 4/622* (2013.01); *H01M 4/625* (2013.01);
(Continued)

(58) Field of Classification Search
None
See application file for complete search history.

(56) References Cited

U.S. PATENT DOCUMENTS

| 2012/0219859 A1 | 8/2012 | Doe et al. |
| 2016/0111720 A1 | 4/2016 | Arthur et al. |
| 2020/0321614 A1 | 10/2020 | Banerjee et al. |

FOREIGN PATENT DOCUMENTS

| WO | WO 2019/126800 | 6/2019 |

OTHER PUBLICATIONS

Andrews, J. L. et al. "Reversible Mg-Ion Insertion in a Metastable One-Dimensional Polymorph of $V_2O_5$," *Chem*, Mar. 8, 2018, pp. 564-585, vol. 4.

(Continued)

*Primary Examiner* — Tracy M Dove
(74) *Attorney, Agent, or Firm* — SALIWANCHIK, LLOYD & EISENSCHENK

(57) ABSTRACT

The Li-ion paradigm of battery technology is fundamentally constrained by the monovalency of the Li-ion. A straightforward solution is to transition to multivalent ion chemistries, with $Mg^{2+}$ the most obvious candidate due to considerations of size and mass. Despite early interest, the realization of Mg batteries has faced myriad obstacles, including a sparse selection of cathode materials demon- (Continued)

strating the ability to reversibly insert divalent ions. Disclosed herein is evidence of reversible topochemical and electrochemical insertion of $Mg^{2+}$ into a metastable one-dimensional polymorph of $V_2O_5$. Not only does $\zeta\text{-}V_2O_5$ represent a rare addition to the pantheon of functional Mg battery cathode materials, but is also distinctive in exhibiting a combination of high stability, high specific capacity due to ion insertion, and moderately high operating voltage.

7 Claims, 17 Drawing Sheets

(51) Int. Cl.
  *H01M 4/62* (2006.01)
  *H01M 10/054* (2010.01)
  *H01M 4/02* (2006.01)

(52) U.S. Cl.
  CPC ....... *H01M 10/054* (2013.01); *C01P 2002/72* (2013.01); *C01P 2002/77* (2013.01); *C01P 2002/78* (2013.01); *C01P 2004/02* (2013.01); *C01P 2004/03* (2013.01); *C01P 2004/04* (2013.01); *C01P 2004/16* (2013.01); *C01P 2006/40* (2013.01); *H01M 2004/028* (2013.01)

(56) References Cited

OTHER PUBLICATIONS

Jiao, L. et al. "Mg intercalation properties into open-ended vanadium oxide nanotubes" *Electrochemistry Communications*, 2005, pp. 431-436, vol. 7.

Horrocks, G. A. et al. "Mitigating Cation Diffusion Limitations and Intercalation-Induced Framework Transitions in a 1D Tunnel-Structured Polymorph of $V_2O_5$" *Chemistry of Materials*, 2017, pp. 10386-10397, vol. 29.

Marley, P. M. et al. "Emptying and filling a tunnel bronze" *Chemical Science*, 2015, pp. 1712-1718, vol. 6, Supporting Information pp. 1-9.

Parija, A. et al. "Topochemically De-Intercalated Phases of $V_2O_5$ as Cathode Materials for Multivalent Intercalation Batteries: A First-Principles Evaluation" *Chemistry of Materials*, 2016, pp. 1-11.

Written Opinion in International Application No. PCT/US2018/067392, Apr. 12, 2019, pp. 1-7.

ELECTROCHEMICAL STORAGE INCORPORATING SIZE- AND MORPHOLOGY-CONTROLLED METASTABLE VANADIUM PENTOXIDE AS A CATHODE MATERIAL FOR ION BATTERIES

CROSS-REFERENCE TO RELATED APPLICATIONS

This application is the U.S. National Stage Application of International Patent Application No. PCT/US2018/067392, filed on Dec. 21, 2018, which claims the benefit of U.S. Provisional Application No. 62/609,220, filed Dec. 21, 2017, which is are incorporated herein in their entirety.

STATEMENT OF GOVERNMENT LICENSE RIGHTS

This invention was made with Government support under DMR 1504702 awarded by the National Science Foundation and under 80NSSC17K0182 awarded by the National Aeronautics and Space Administration. The Government has certain rights in the invention.

BACKGROUND

Electrochemical energy storage is at a crossroads where numerous fundamental impediments must be addressed for large-volume production to meet technology needs in transportation and grid storage.[1] The shortcomings of the current paradigm, the Li-ion battery, are well known.[2] Significant effort has been devoted both to maximizing the energy density of electrochemical cells via the discovery of new solid electrode materials that can intercalate high concentrations of Li-ions at either highly reducing or oxidizing potentials,[3] and to improving kinetics and reversibility by nanostructuring existing candidates.[4,5] However, Li-ion batteries continue to encounter issues of safety and sustainability and are ultimately limited by the most fundamental of limitations: the monovalency of the Li-ion.

Several alternatives have been proposed as direct replacements for Li-ion technology, including Na-ion and multivalent ion ($Mg^{2+}$, $Ca^{2+}$, and $Al^{3+}$) technologies. Na-ion is viewed as a direct and more sustainable replacement to Li-ion owing to its monovalency and greater crustal abundance. However, the much larger radius of $Na^+$ creates bottlenecks to reversible insertion and $Na^+$ technologies do not overcome limitations of Li-ion in terms of the amount of charge that can be stored. In contrast multivalent-ion technologies are viewed as competitive successors to Li-ion batteries in part due to the prospect of storing more charge per ion at the cathode (most cathodes are limited by the number of available sites and not the accessible redox). These cations have the added benefit of being much more earth abundant than Li, and much less reactive in metallic form, adding to the safety of the technology. In particular, batteries based on the shuttling of $Mg^{2+}$ represent the most attractive alternatives because the small size and mass of these ions can be extrapolated to high theoretical energy storage metrics.[2,6] Indeed, the use of metallic Mg as the anode would bring about a transformative leap in volumetric energy density (theoretically predicted values are 3832 $mAh/cm^3$ for metallic Mg versus ca. 800 $mAh/cm^3$ for the graphite anode of Li-ion cells).[6,7] The shift to Mg also promises to allay long-term concerns regarding the sustainability of Li-ion battery technologies stemming from the low crustal abundance of Li (0.006%),[8] which will eventually necessitate the mining of Li from brine and deep-sea vents, leading to potential environmental impacts of unknown severity.[9,10] In contrast, magnesium has a much higher abundance than lithium (1.94%),[8] and is more desirable from a safety perspective because magnesium is non-dendrite forming, effectively eliminating the risk of thermal runaway.[11,12]

Despite the straightforward conceptual notion of substituting a monovalent cation for a divalent cation, attempts at developing Mg battery technologies have been thwarted by a plethora of materials limitations, including a lack of suitable electrolytes[8,13]-15 and cathode materials. Arguably the greatest of these obstacles is the lack of high voltage cathode materials amenable to the reversible insertion of Mg-ions, primarily due to their slow solid state diffusion kinetics, which have been attributed to the significant polarization of anionic frameworks and stronger cation-cation repulsions induced by the much more "hard" (high charge-to-radius ratio) Mg-ion.[6] This same problem has plagued the search for Al-ion batteries, making suitable cathode materials even rarer, since the highly localized trivalent charge is even more polarizing.[16] One proposed approach to solving this problem is to move beyond Mg-ion to Ca-ion chemistries, thereby retaining the benefits of the divalent charge but increasing the radius and thus decreasing the polarizing strength of the intercalating cation; however, as in the case of the larger $Na^+$, the increased ionic radius of $Ca^{2+}$ makes the identification of suitable cathode materials rather difficult.[17,18]

Currently, Al-[19] and Ca-ion[17,18] cathode architectures are very scarce and will not be discussed further herein. However, it is worth noting that several modifications of the $V_2O_5$ framework have found use as cathode materials for Li-, Na-, and Mg-ion insertion. In particular, the thermodynamically stable (orthorhombic) phase of $V_2O_5$, a naturally occurring mineral ore, has been extensively studied as a cathode material for electrochemical insertion of various cations. In fact, this material was one of the first proposed by Whittingham when evaluating materials for Li-ion intercalation.[20] Indeed, $\alpha$-$V_2O_5$ presents many desirable characteristics; it is a layered material, with ample interlayer spacing within which to accommodate intercalating ions. The 'single-layered' $V_2O_5$ structure comprises up-up-down-down-facing $VO_5$ square pyramids, which are edge and corner-sharing. Lithium, which is small, can diffuse through this framework although small polarons are stabilized, coupling the intercalated Li-ions with an electron and a localized lattice distortion.

While Na-[21] and Mg-ion[22-24] intercalation in the orthorhombic single-layer $V_2O_5$ has been observed, capacities are much lower than expected based on spatial or redox considerations (~0.17 Mg per $V_2O_5$).[22] Relatively higher capacities have been observed for the xerogel phase of $V_2O_5$.[25,26] This xerogel phase is a bilayered $V_2O_5$ polymorph, which incorporates interlayer and structural water molecules[27] and can more accurately be described as having a composition of $V_2O_5 \cdot 1.8H_2O$. There are two structural features of the xerogel phase which contribute to the increased intercalation capacities observed for $Na^+$ and $Mg^{2+}$. First, the water present within the structure greatly expands the interlayer spacing from 4.37 Å for $\alpha$-$V_2O_5$ to 11.53 Å for the bilayered structure.[27] As mentioned previously, the primary difficulty in intercalating Na-ions is accounting for the increased ionic radius. In this way, the expanded interlayer spacing of this xerogel or 'bilayered' phase increases the capacity of Na-ions. The water present in the interlayer spacing serves a second role when intercalating Na- and Mg-ions. The water molecules likely coordinate to the diffusing species and help to screen the cation charge, thereby facilitating diffusion. Li-ion intercalation has further been explored within a metastable puckered γ-Li$_x$V$_2$O$_5$ phase;[28] the puckered framework is retained upon reversible lithiation.[29] However, the intercalation of Na- or Mg-ions within this phase remains to be examined although recent calculations[30] indicate the feasibility of Na- and Ca-ion intercalation within this framework. A second example of the use of metastable V$_2$O$_5$ phases as cathode materials is for lithium insertion into the quenched high-pressure β-V$_2$O$_5$ phase, which comprises double-layered V$_2$O$_5$ units incorporating corner-sharing motifs.[31] However, the 'saw-tooth' structure of this polymorph represents a particularly tortuous pathway for Li-ion diffusion; let-alone for Mg$^{2+}$ diffusion. To date, there have been no reports of metastable V$_2$O$_5$ polymorphs being used as cathode materials for multivalent-ion batteries. This study thus provides a first example of using a metastable phase as a multivalent ion cathode material.

The importance of evaluating metastable phases as cathode materials derives from recent reports which demonstrate that the crystal structure motifs of potential cathode materials are only one aspect of designing cathode materials to accommodate ions beyond Li;[16,30,32] specifically, the electronic structure of such candidates is of equal importance in facilitating ion diffusion.[16,30,32] Consequently, for reasons of both crystallographic and electronic structure, many proposed cathode materials are not able to accommodate Na$^+$ and multivalent cations such as Ca$^{2+}$, Mg$^{2+}$, and Al$^{3+}$, because structural or electronic structure impediments that may be minor for the monovalent Li$^+$ are exacerbated for di- and trivalent ions. Metastable phases hold promise for a allowing a broader range of structural motifs and connectivity but remain to be examined as viable cathode materials. Specifically, in the case of Mg$^{2+}$, the few suitable materials that are able to undergo Mg$^{2+}$ insertion[6,21,33-40] are often limited by poor reversibility and massive phase inhomogeneity due to charge trapping and small polaron formation.[41,42] Mitigating this problem often requires heavy chalcogenide anionic frameworks, such as the Mo$_6$S$_8$ Chevrel phases, to screen Mg$^{2+}$ as it diffuses, leading to fundamentally lower operating potentials (ca. 1 V vs. Mg$^{2+}$/Mg$^0$)[43-47] and gravimetric capacities.[33,43] Utilizing an oxide cathode promises fundamentally greater operating potentials[48] and improved gravimetric capacities; however, an oxide that combines the attributes necessary for reversible Mg$^{2+}$ insertion from non-aqueous electrolytes with a high potential of operation remains elusive. Among the oxides studied so far, Mg$^{2+}$ insertion with a reasonable voltage has been achieved in α-V$_2$O$_5$[23,49] and in related xerogels containing water[21,40]; however, despite calculations which predict that the high-temperature δ-Mg$_{0.5}$V$_2$O$_5$ phase (isostructural with δ-LiV$_2$O$_5$[50]) might be accessible upon magnesiation[36] as well as claims of capacities as large as Mg$_{0.66}$V$_2$O$_5$,[13,51] it has been demonstrated by direct evidence that Mg$^{2+}$ insertion levels are much smaller, around Mg$_{0.17}$V$_2$O$_5$,[22,23] where the excess capacity observed in several studies has been attributed to proton intercalation.[24]

Metastable V-O frameworks stabilized by the topochemical extraction of cations from ternary vanadium oxides represent a broad palette of possible electrode materials;[16,30] such materials are characterized by entirely different vanadium-oxygen connectivity not accessible within thermodynamic minima and greatly expand the available scope of cathode materials. Several of these compounds could enforce 'frustrated coordination environments' on the Mg-ions and should thus facilitate the facile diffusion of highly polarizing inserted species.[16,36,52] Furthermore, the elimination of split-off conduction bands characteristic of 2D materials and the resulting improved d-band overlap in structures with 3D connectivity can substantially mitigate charge localization and the resulting stabilization of small polarons[41,53] that impede ion diffusion.

SUMMARY

An embodiment of the disclosure is a metastable ζ-V$_2$O$_5$ nanowire. In an embodiment, the metastable ζ-V$_2$O$_5$ nanowire has lattice constants comprising: a=15.294±0.415 Å, b=3.625±0.26 Å, and c=10.0986±0.26 Å. In an embodiment, the metastable ζ-V$_2$O$_5$ nanowire further comprises one or more ions intercalated into interstices of the metastable ζ-V$_2$O$_5$ nanowire. In an embodiment, the one or more ions include one or more ions selected from the group consisting of Li$^+$ ions, Na$^+$ ions, Al$^{3+}$ ions, Y$^{3+}$ ions, Ca$^{2+}$ ions, Mg$^{2+}$ ions, Zn$^{2+}$ ions, and combinations thereof. In an embodiment, the one or more ions include one or more Mg$^{2+}$ ions. In an embodiment, the metastable ζ-V$_2$O$_5$ nanowire has a formula of Mg$_x$V$_2$O$_5$, wherein x is between about 0.01 and about 0.85. In an embodiment, the interstices include one or more one-dimensional tunnels configured to reversibly accept the one or more ions. In an embodiment, the metastable ζ-V$_2$O$_5$ nanowire has a unit cell volume, V, between about 515 Å$^2$ and about 540 Å$^2$. In an embodiment, the metastable ζ-V$_2$O$_5$ nanowire has a unit cell angle, β, between about 108° and about 111°. In an embodiment, the metastable ζ-V$_2$O$_5$ nanowire has a smallest dimension between about 50 nm and about 1000 nm.

An embodiment of the disclosure is a battery comprising a cathode comprising the metastable ζ-V$_2$O$_5$ nanowire above. In an embodiment, the battery is a Mg-ion battery. In an embodiment, a first ion discharge capacity is greater than or equal to 140 mAh/g.

In an embodiment, an ion discharge capacity after 50 cycles is greater than or equal to 90 mAh/g. In an embodiment, the cathode further comprises a conductive agent and a polymeric binder. In an embodiment, the battery further comprises an anode selected from the group consisting of activated carbon cloth, Mg metal, a Mg alloy containing Mg, and an intermetallic compound containing Mg (e.g., Mg—Bi, Mg—Sn, Mg—Sb).

An embodiment of the disclosure is a method of making ζ-V$_2$O$_5$ nanowires comprising: hydrothermally reacting a V$_2$O$_5$ source and a silver source to provide β-Ag$_x$V$_2$O$_5$ nanowires; and hydrothermally reacting the β-Ag$_x$V$_2$O$_5$ nanowires in an acidic aqueous solution, thereby topochemically leaching Ag ions from the β-Ag$_x$V$_2$O$_5$ nanowires to provide ζ-V$_2$O$_5$ nanowires. In an embodiment, a molar ratio between the V$_2$O$_5$ source and the silver source is about 3:1. In an embodiment, the method further comprises washing the ζ-V$_2$O$_5$ nanowires with an aqueous solution of Na$_2$S$_2$O$_3$, thereby removing AgCl from the ζ-V$_2$O$_5$ nanowires. In an embodiment, the washing step is repeated 3 times. In an embodiment, the method further comprises intercalating one or more ions selected from the group consisting of Li$^+$ ions, Na$^+$ ions, Al$^{3+}$ ions, Y$^{3+}$ ions, Ca$^{2+}$ ions, Mg$^{2+}$ ions, Zn$^{2+}$ ions, and combinations thereof. In an embodiment, the cathode material is pre-intercalated with one of the ions before cycling within a battery.

An embodiment of the disclosure is a method of making magnesiated metastable ζ-V$_2$O$_5$ nanowires comprising: topochemically inserting Mg$^{2+}$ ions into ζ-V$_2$O$_5$ nanowires.

In an embodiment, topochemically inserting $Mg^{2+}$ ions into $\zeta$-$V_2O_5$ nanowires includes contacting the $\zeta$-$V_2O_5$ nanowires with an aqueous suspension of Mg nanoparticles. In an embodiment, topochemically inserting $Mg^{2+}$ ions into $\zeta$-$V_2O_5$ nanowires includes contacting the $\zeta$-$V_2O_5$ nanowires with an organic solution of alkyl-Mg. In an embodiment, $\zeta$-$V_2O_5$ nanowires are contacted with a Mg-ion electrolyte and a voltage is applied thereby inserting $Mg^{2+}$ ions into the $\zeta$-$V_2O_5$ nanowires. In an embodiment, the Mg-ion electrolyte includes a solution of a Mg complex dissolved in a solvent. In an embodiment, the Mg-ion electrolyte includes a Mg complex dispersed within a conductive polymer. In an embodiment, the Mg-ion electrolyte is a solid-state compound with a high diffusivity of Mg-ions. In an embodiment, the magnesiated metastable $\zeta$-$V_2O_5$ nanowires have lattice constants comprising: a=15.30±0.4 Å, b=3.63±0.02 Å, and c=10.1±0.03 Å. In an embodiment, the magnesiated metastable $\zeta$-$V_2O_5$ nanowires have a unit cell angle, $\beta$, between about 109.1° and about 110.1°.

The foregoing has outlined rather broadly the features of the present disclosure in order that the detailed description that follows may be better understood. Additional features and advantages of the disclosure will be described hereinafter, which form the subject of the claims.

DESCRIPTION OF THE DRAWINGS

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which.

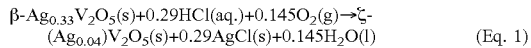
(Eq. 1)

The empty $\zeta$-$V_2O_5$ polymorph is evaluated for both chemical and electrochemical Mg-ion insertion. In the topochemical approach, shown here, di-n-butylmagnesium is used as the magnesiating agent (Eq. 2) as per:

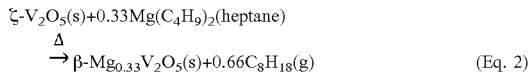
(Eq. 2)

and $NOBF_4$ is used as the demagnesiating agent (Eq. 3) as per:

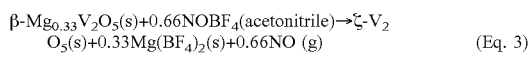
(Eq. 3)

The synthetic procedures are described herein.

Figures 2A, 2B, 2C:
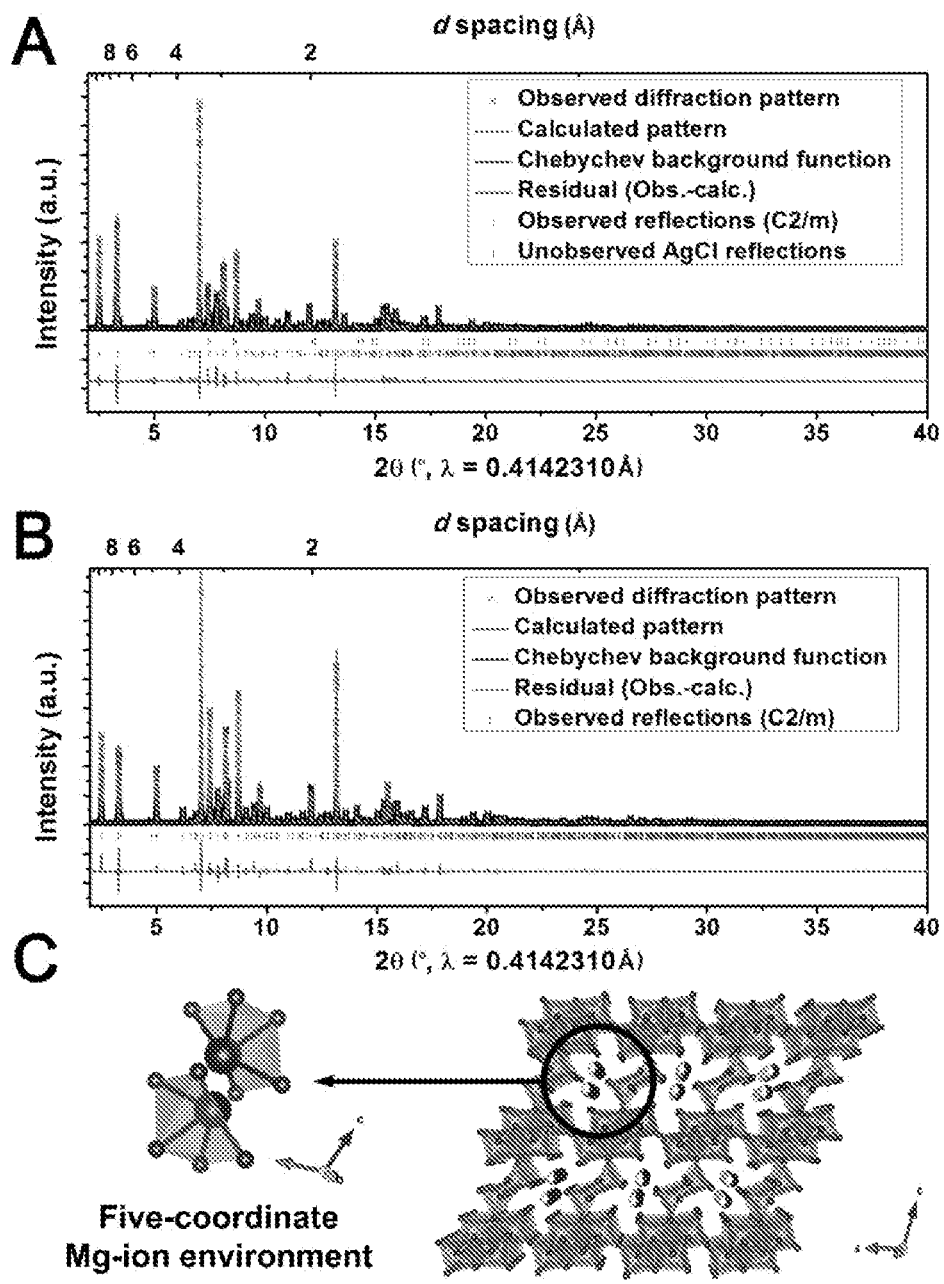

FIGS. 2A-2C. Elucidating the structure of empty and magnesiated frameworks. High-resolution synchrotron powder X-ray diffraction data ($\lambda$=0.4136 Å) collected for 2(A) empty $\zeta$-$V_2O_5$, and for 2(B) the chemically-magnesiated structure $\beta$-$Mg_xV_2O_5$, synthesized using the same sample shown in 2(A). The raw collected data is represented as black crosses, the Rietveld fit is shown as a red line, the background function is depicted as a dark blue line, and the residual (observed-calculated) is depicted as a light blue line. A magnified view of the 2$\theta$=8.5-8.9° range of 2(A) showing that the refined structure maps well to the peak profiles and confirms the phase purity and successful elimination of residual AgCl. 2(C) A refined structure of the chemically-magnesiated $\zeta$-$V_2O_5$ phase, where Mg sits in an approximately square-pyramidal $\beta$-site. A fractional occupancy of x=0.331 is obtained for magnesium on this site.

Figures 3A, 3B:
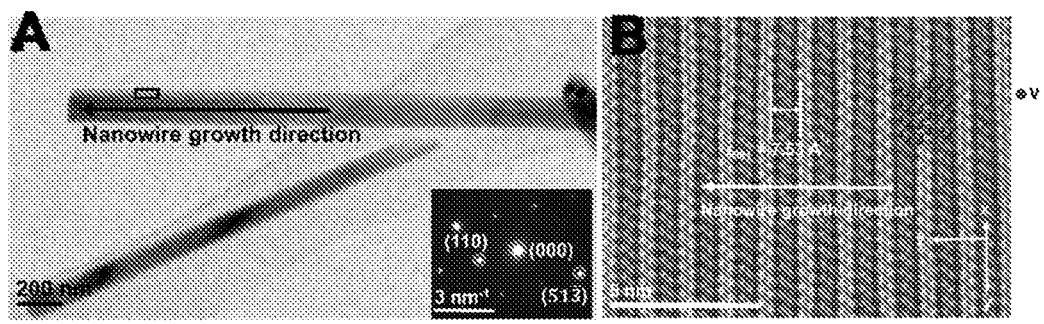

FIGS. 3A-3B. Electron microscopy characterization data for pristine $\zeta$-$V_2O_5$. 3(A) Low-magnification TEM image of $\zeta$-$V_2O_5$ nanowires, thin area used for atomic-resolution imaging marked with a rectangle, inset shows electron diffraction. 3(B) Atomic-resolution high angle annular dark field (HAADF) image (filtered) showing tunnels perpendicular to nanowire growth. Structural model for $\zeta$-$V_2O_5$ along the [110] zone axis showing V atoms (light blue) overlaid on the experimental image. Scale bars for the images are 3(A) 200 nm, inset 3(A) 3 $nm^{-1}$ and 3(B) 5 nm.

FIGS. 4A-4D. Structural, compositional, and morphological characterization of chemically-cycled $\zeta$-$V_2O_5$. 4(A) Powder XRD patterns showing reversible topochemical intercalation and extraction of $Mg^{2+}$ as per Eqs. 2 and 3 above. The slight expansion of the lattice upon incorporation of Mg-ions is reflected in a shift of the (001) and (002) reflections to lower 2$\theta$ values, as depicted in the magnified regions of 4(A). The intensities of the reflections shown in the magnified regions are normalized such that the intensity of the (200) reflection is unity. SEM images of 4(B) pristine $\zeta$-$V_2O_5$ nanowires, 4(C) chemically-magnesiated $\beta$-$Mg_xV_2O_5$ nanowires, and 4(D) $NOBF_4$-leached $\zeta$-$V_2O_5$ nanowires. The scale bars on the SEM images are 1 μm, 3 μm, and 1 μm, respectively. The retention of morphology after each reaction corroborates the topochemical nature of the reaction.

Figures 5A, 5B, 5C:
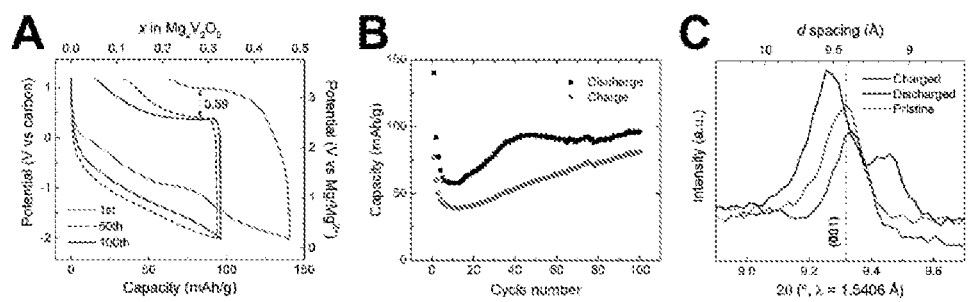

FIGS. 5A-5C. Electrochemical cycling and corresponding structural changes of $\zeta$-$V_2O_5$. 5(A) Voltage versus capacity profiles acquired at different cycle numbers for the electrochemical cycling of $\zeta$-$V_2O_5$. After 50 cycles, the material exhibits a stable discharging capacity of 90 mAh/g with an exceptional average operating voltage of 1.65 V versus Mg/$Mg^{2+}$. 5(B) Capacity versus cycle number plot (for cycles 1-85), which illustrates the exceptional stability and reversibility of the material during cycling 5(C) XRD patterns of pristine, discharged, and subsequently charged $\zeta$-$V_2O_5$.

Figures 6A, 6B, 6C:
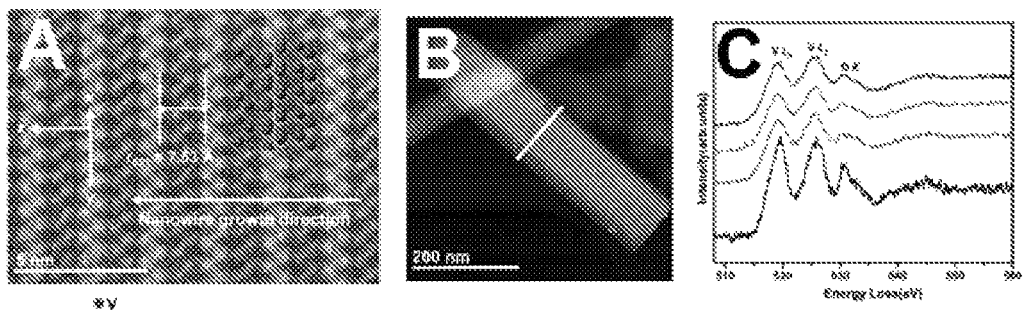
Figures 12A, 12B, 12C:
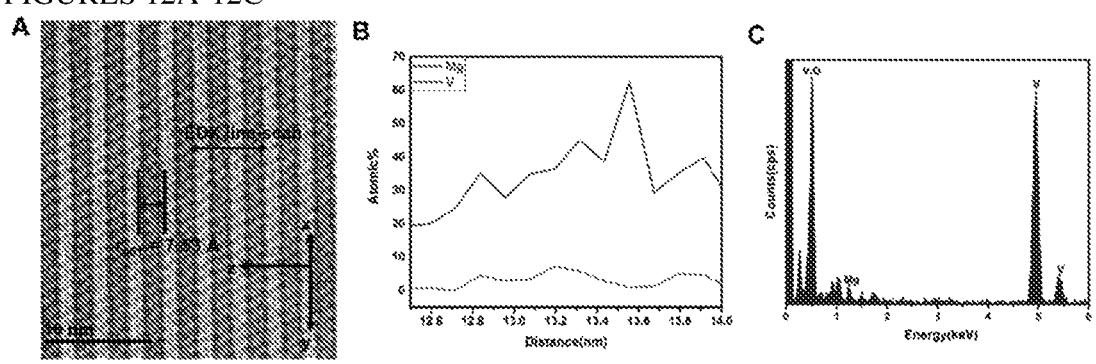

FIGS. 6A-6C. Electron microscopy characterization data for electrochemically-magnesiated $\zeta$-$V_2O_5$. 6(A) Atomic-resolution HAADF image of the electrochemically-magnesiated $\zeta$-$V_2O_5$ nanowires (collected following the initial discharge cycle), corresponding structural model for $\zeta$-$V_2O_5$ along the [110] zone axis overlaid. 6(B) HAADF image showing nanowire for EELS linescan with the probed area clearly marked. 6(C) Comparison of EEL spectra between pristine and electrochemically-magnesiated $\zeta$-$V_2O_5$ nanowire showing a reduction of the V valence state in the magnesiated sample. An integrated EDX spectrum showing ca. 4±0.4 at. % of Mg, corresponding to a stoichiometry in the range of ca. $Mg_{0.26}V_2O_5$—$Mg_{0.32}V_2O_5$ as shown in FIG. 12(C). Scale bars for the images are: 6(A) 5 nm and 6(B) 200 nm.

FIG. 7A-7G. X-ray absorption spectroscopy measurements (XAS) and density functional theory calculations (DFT) of chemically-magnesiated and -demagnesiated $\zeta$-$V_2O_5$. 7(A) Integrated X-ray absorption spectra collected for individual nanowires of empty $\zeta$-$V_2O_5$ precursor (black), magnesiated $\beta$-$Mg_xV_2O_5$ (blue), $NOBF_4$-leached $\zeta$-$V_2O_5$ (red), and β'-Li$_{0.66}$V$_2$O$_5$ (green). The spectra are superimposed to highlight changes in electronic structure upon insertion and extraction of Mg-ions. 7(B) Ensemble Mg K-edge X-ray absorption spectra were collected for magnesiated samples and are superimposed with spectra acquired for a MgO standard. Spectra for samples magnesiated as in aqueous media using Mg nanoplatelets and as per Eq. 4 in heptane solution using di-n-butylmagnesium are contrasted:

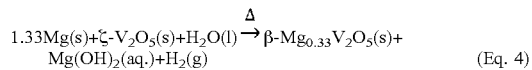

$$1.33Mg(s)+\zeta\text{-}V_2O_5(s)+H_2O(l) \xrightarrow{\Delta} \beta\text{-}Mg_{0.33}V_2O_5(s)+Mg(OH)_2(aq.)+H_2(g) \quad \text{(Eq. 4)}$$

7(C) A simplified schematic representation of the hybridization of V 3d orbitals and O 2p orbitals in the valence and the conduction bands. Three crystallographically inequivalent vanadium atoms each have somewhat different splitting of 3d states owing to differences in their local coordination environment. GGA DFT+U calculated atom-projected density of states (DOS) for V (red), O (green), and Mg (blue) for ζ-V$_2$O$_5$ magnesiated to a limit of 7(D) x=0.083 and 7(E) x=0.33. Upper and lower halves of the DOS correspond to up and down spins, respectively, where the V-O 'midgap state' at the edge of the conduction band (ca. 0.5 eV) is not present in the lower half. The gray regions correspond to the total density of states. Local density of states (LDOS) for ζ-V$_2$O$_5$ magnesiated to 7(F) x=0.083 and 7(G) x=0.33.

Figure 8:
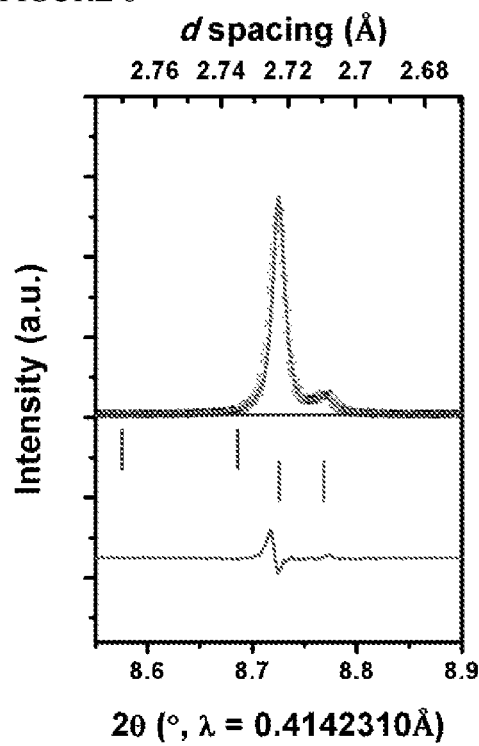

FIG. 8. Magnified region of the high-resolution synchrotron diffraction pattern shown in FIG. 2A for phase-pure ζ-V$_2$O$_5$. Two major reflections characteristic of AgCl (Fm$\bar{3}$m, 5.45 and 5.54 unit cells), which should appear at 2θ values of ~8.55 2θ and ~8.65 (purple tick marks) are not observed in the displayed 2θ range (8.5-8.9°). Furthermore, no AgCl reflections are observed in the entire range. The absence of AgCl reflections indicates the successful removal of the AgCl impurity.[S1]

Figures 9A, 9B:
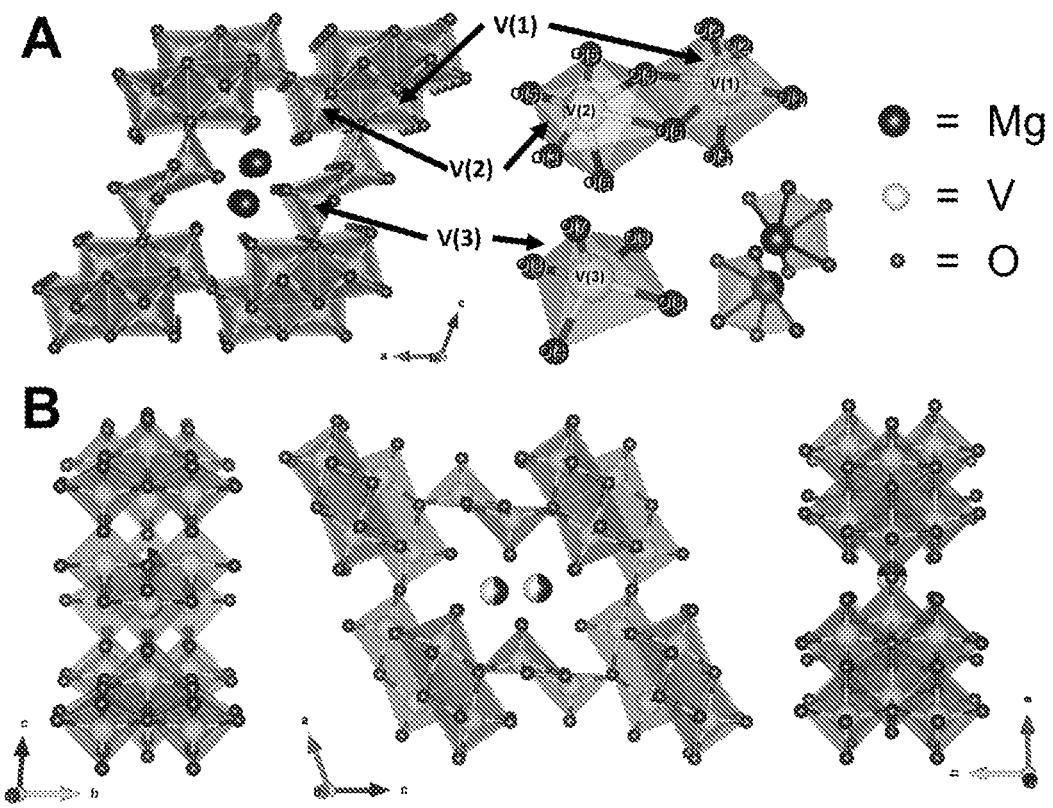

FIGS. 9A-9B. Structure of β-Mg$_{0.33}$V$_2$O$_5$ obtained by Rietveld refinement of the structural model using synchrotron powder X-ray diffraction pattern. Individual vanadium and magnesium polyhedra are depicted in 9(A), where the vanadium octahedra and square pyramid are depicted in grey. The frustrated five-coordinated MgO$_5$ coordination environment is depicted in orange. A single unit cell is depicted in 9(B) where the structure can be viewed along the a, b, and c axes, respectively.

Figures 10A, 10B, 10C:
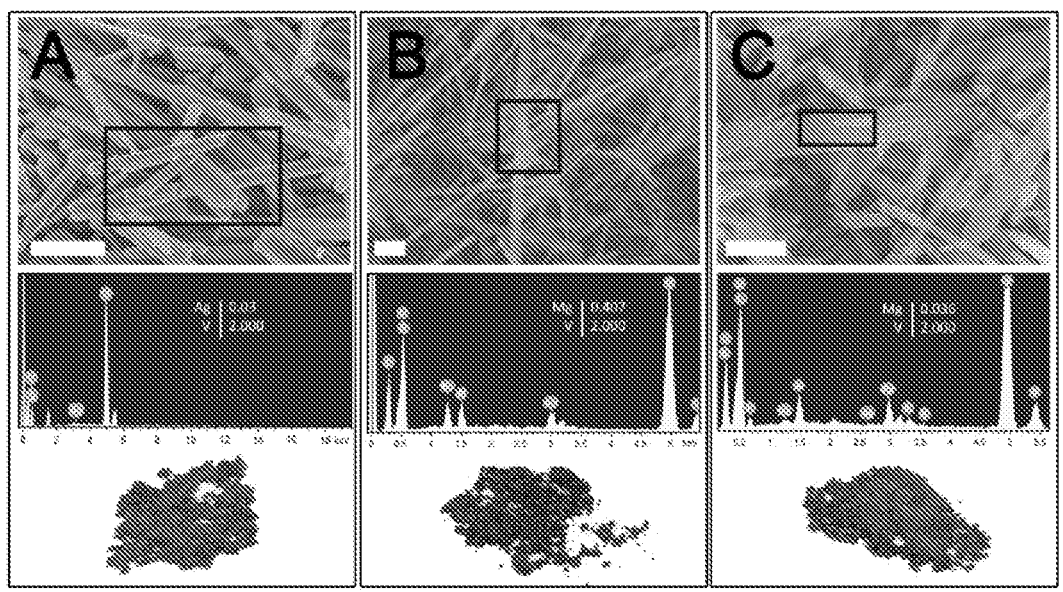

FIG. 10A-10C. Evidence of Mg-ion insertion in ζ-V$_2$O$_5$. Scanning electron micrograph, energy dispersive X-ray spectrum, and optical image for 10(A) pristine, as-prepared ζ-V$_2$O$_5$, 10(B) magnesiated β-Mg$_x$V$_2$O$_5$, and 10(C) NOBF$_4$-leached ζ-V$_2$O$_5$. The SEM images indicate retention of nanowire morphology, confirming the topochemical nature of the chemical magnesiation/demagnesiation process. The blue boxes in the SEM images indicate the region from which the semi-quantitative EDS was acquired, which shows qualitatively the insertion/deinsertion of the magnesium. The optical images illustrate that the reduction of the V$_2$O$_5$ lattice on Mg$^{2+}$ insertion is accompanied by a change in color from orange/brown characteristic of V$^{5+}$ to a dark green, indicative of a mixed V$^{4+/5+}$ vanadium valence. Upon topochemical leaching of the magnesium from within the tunnels, restoration of the orange/brown coloration is observed, suggesting a concomitant reduction/oxidation of the lattice with Mg$^{2+}$ insertion.

Figure 11:
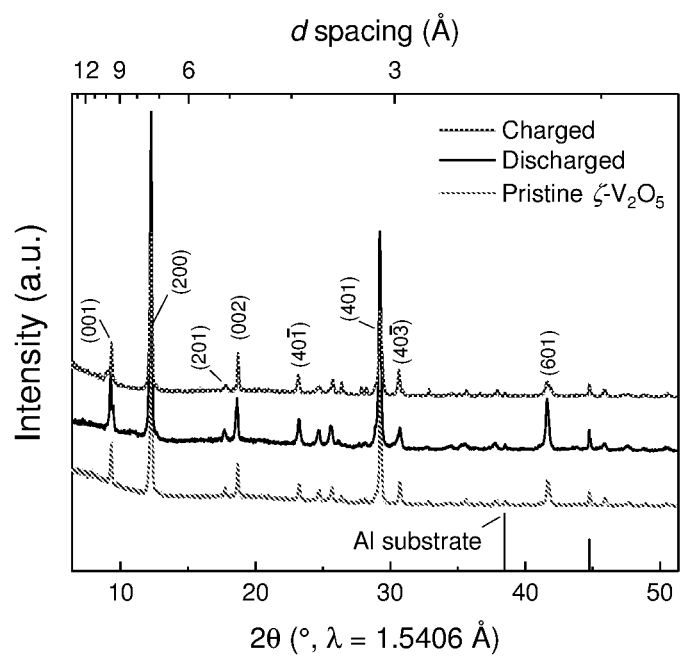

FIG. 11. Expanded region of the diffraction pattern depicted in FIG. 6B. All reflections revert to their original position upon demagnesiation, indicating the topotactic nature of the insertion, as well as the reversibility of the reaction. The similarities between the diffraction patterns collected for electrochemical (FIG. 11) and chemical (FIG. 3) cycling are striking.

FIG. 12A-12C. EDX line scan normal to the tunnel growth direction acquired for the electrochemically cycled ζ-V$_2$O$_5$ nanowires. 12(A) Atomic-resolution HAADF image in the [110] zone axis, showing the direction of the EDX line scan perpendicular to the tunnel growth direction. Scale bar is 10 nm 12(B) the results of the EDX line scan showing V (blue) and Mg (red) signals in units of atomic percent. 12(C) Integrated EDX scan showing relative intensities of the V, O, and Mg. The integrated values yield a ca. 4±0.4 at % value for Mg, corresponding to a stoichiometry in the range Mg$_{0.26}$V$_2$O$_5$—Mg$_{0.32}$V$_2$O$_5$.

Figure 13:
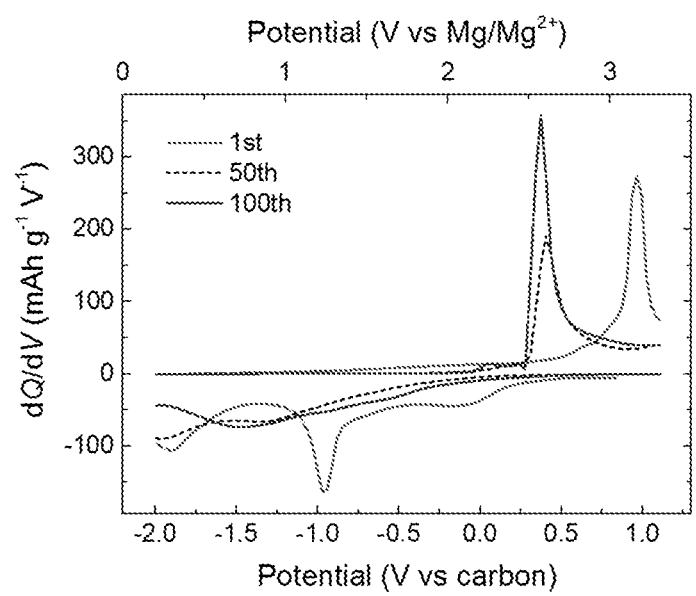

FIG. 13. First derivative, dQ/dV plot derived from FIG. 5A used to determine the reported average operating voltage (1.65 V vs)Mg$^{2+}$/Mg$^0$). Curves for the 1$^{st}$, 50$^{th}$, and 100$^{th}$ cycles are depicted in solid-red, dashed-black, and solid-blue respectively.

FIGS. 14A-14F. 14(A), 14(B), 14(C), and 14(D) Selected optimized structures of Mg$_x$V$_2$O$_5$. The O and Mg atoms are shown in red and blue, respectively; 14(E) Calculated voltage profile for Mg insertion into ζ-V$_2$O$_5$ for various values of U; 14(F) A comparison of the relative energies of the metastable polymorphs ζ-V$_2$O$_5$ (in eV) with α-V$_2$O$_5$ for both the charged and discharged states. The relative instability of the metastable phase ζ-V$_2$O$_5$ with respect to α-V$_2$O$_5$ is plotted using a light green bar. The numerical sum of these two values (shown on top of the bars) provides a measure of the open circuit voltage.

Figure 15:
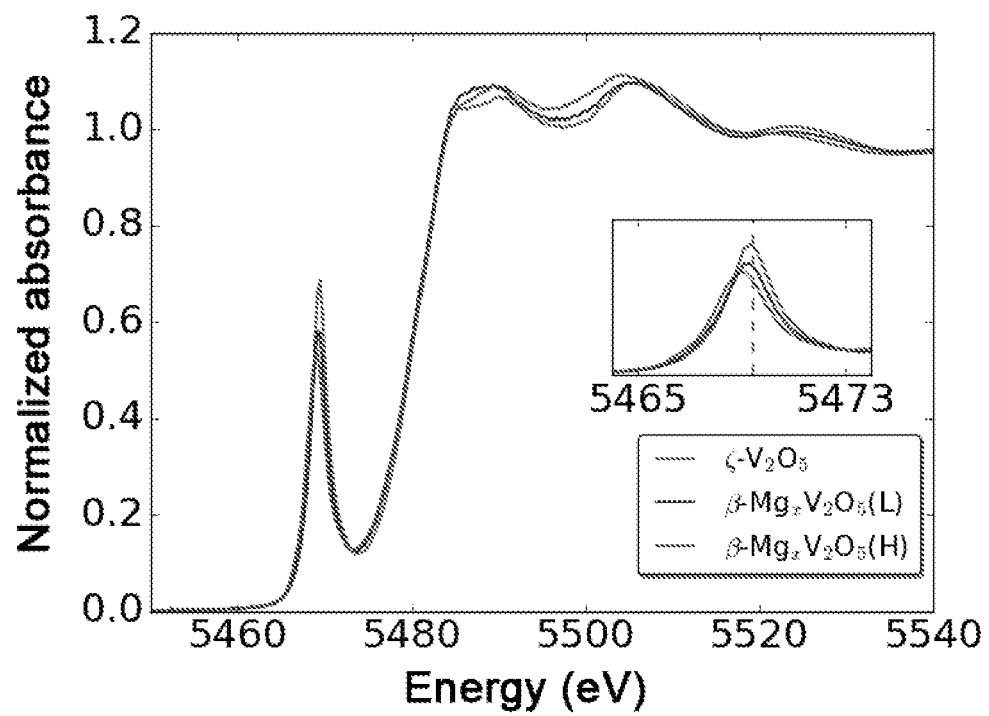

FIG. 15. Vanadium K-edge normalized spectra collected for pristine ζ-V$_2$O$_5$ (in red), magnesiated β-Mg$_x$V$_2$O$_5$ (with intended x value of ca. 0.2, in blue), and magnesiated β-Mg$_x$V$_2$O$_5$ (in green, with intended x value of 0.48 magnesiation was performed using di-n-butylmagnesium as per Eq. 2). The inset plot shows an expanded view of the pre-edge peak centered at ~569 eV and depicts a red-shift of the peak indicating local reduction of the vanadium.

Figures 16A, 16B:
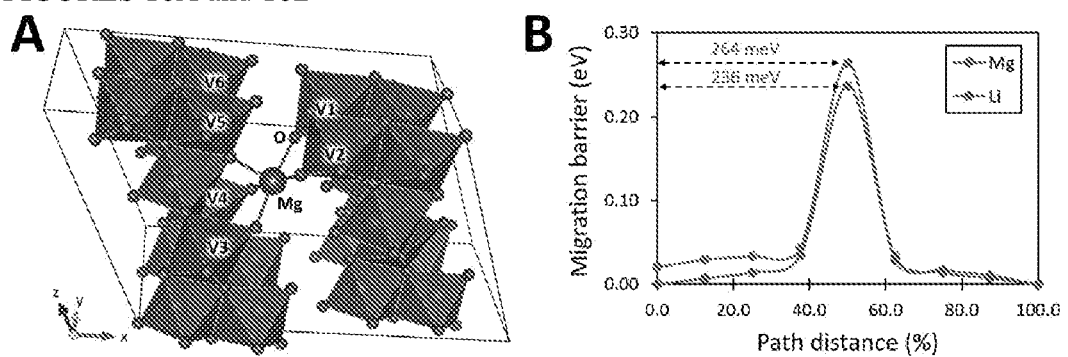

FIGS. 16A-16B. 16(A) The possible sites for polaron formation on vanadium atoms marked as V1-5 after insertion of Mg ion in β-Mg$_{0.083}$V$_2$O$_5$; 16(B) the energy barrier for the migration of bi-polaron on V2 and V3 to V1 and V3 in β-Mg$_{0.083}$V$_2$O$_5$, and the migration of a polaron on V5 to V6 in β'-Li$_{0.083}$V$_2$O$_5$. Migration barriers for the polaron between various sites in panel 16(A) are tabulated in Table S12.

Figures 17A, 17B:
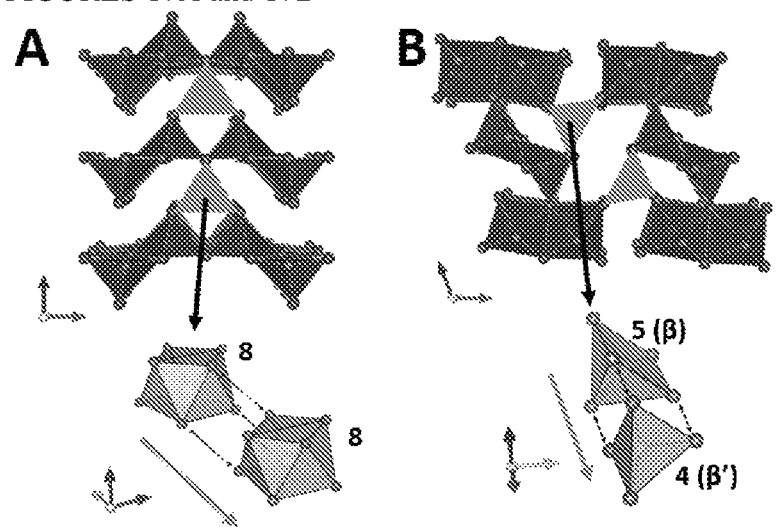

FIGS. 17A-17B. Depiction of local coordination environments and diffusion pathways accessible for Mg$^{2+}$ in 17(A) α-Mg$_x$V$_2$O$_5$; and 17(B) β-Mg$_x$V$_2$O$_5$. A magnified view of the coordination environments is shown in the lower panel. The green arrow shows the lowest energy diffusion pathways as determined by nudged elastic band calculations; the number labels represent the change in coordination number along this pathway.

DETAILED DESCRIPTION

Herein it is demonstrated that a metastable ζ-phase of V$_2$O$_5$, stabilized by topochemical leaching of cations from β-phase ternary vanadium oxide bronzes,[54] is capable of reversibly inserting Mg-ions up to and beyond 0.33 Mg-ions per V$_2$O$_5$ unit within its 1D tunnel framework. Various methods of magnesiation including aqueous and non-aqueous chemical insertion of Mg$^{2+}$ and high-voltage electrochemical magnesiation are demonstrated for this framework, clearly illustrating its ability to function as a reversible Mg-ion insertion host.

Herein, provided are a refined crystal structure of the chemically-magnesiated material, detail of the electronic structure of the relevant phases to elucidate the mechanistic basis for the observed facile and reversible magnesiation, and an evaluation the electrochemical performance of the material in a coin cell.

Accordingly, in an aspect, the present disclosure provides a metastable $\zeta$-V$_2$O$_5$ nanowire. As described further herein, the oxygen atoms of such metastable $\zeta$-V$_2$O$_5$ nanowires are configured to reversibly coordinate with one or more metal ions, such as one or more Mg ions. As also described further herein, such reversible coordination of metal ions by the metastable $\zeta$-V$_2$O$_5$ nanowires of the present disclosure makes them suitable as, for example, cathode materials in insertion batteries.

In an embodiment, the metastable $\zeta$-V$_2$O$_5$ nanowires include one or more ions intercalated into and coordinated by interstices of the metastable $\zeta$-V$_2$O$_5$ nanowire. In an embodiment, the one or more ions include one or more ions selected from the group consisting of Li$^+$ ions, Na$^+$ ions, Al$^{3+}$ ions, Y$^{3+}$ ions, Ca$^{2+}$ ions, Mg$^{2+}$ ions, and Zn$^{2+}$ ions, and combinations thereof.

In an embodiment, the one or more ions include one or more Mg$^{2+}$ ions. As described further herein, the metastable $\zeta$-V$_2$O$_5$ nanowires of the present disclosure are useful in reversibly coordinating with one or more Mg$^{2+}$ ions and may coordinate with Mg$^{2+}$ ions over a broad range of stoichiometries. Accordingly, in an embodiment, the metastable $\zeta$-V$_2$O$_5$ nanowire has a formula of Mg$_x$V$_2$O$_5$, wherein x is between about 0.01 and about 0.85.

As discussed further herein, such metal ions may be reversibly inserted into and extracted from the metastable $\zeta$-V$_2$O$_5$ nanowire many times. For example, in an embodiment, metal ions may be reversibly inserted into and extracted from the metastable $\zeta$-V$_2$O$_5$ nanowire 10 times, 20 times, 50 times, 100 times, 200 times, 500 times, or more without significantly affecting the structure of the metastable $\zeta$-V$_2$O$_5$ nanowire and, accordingly, its ability to further accept and coordinate metal ions into its interstices. As discussed further herein with respect to batteries of the present disclosure, such reversible insertion and extraction leads to high ion discharge capacities.

The metastable $\zeta$-V$_2$O$_5$ nanowires of the present disclosure have a structure suitable for reversible ion insertion. In that regard, in an embodiment, the metastable $\zeta$-V$_2$O$_5$ nanowires described herein include a metastable $\zeta$-V$_2$O$_5$ nanowire having lattice constants comprising: a=15.294±0.415 Å, b=3.625±0.26 Å, and c=10.0986±0.26 Å. In an embodiment, the metastable $\zeta$-V$_2$O$_5$ nanowire has a unit cell volume, V, between about 515 Å$^2$ and about 540 Å$^2$. As discussed further herein, such lattice parameters and unit cell volume are indicative of a metastable $\zeta$-V$_2$O$_5$ nanowire that has far fewer ions derived from a precursor material permanently intercalated into and coordinated into the interstices of the a metastable $\zeta$-V$_2$O$_5$ nanowire. In this regard, the metastable $\zeta$-V$_2$O$_5$ nanowire of the present disclosure is able to reversibly accept more multivalent metal ions than previous V$_2$O$_5$ materials, thus leading to higher ion discharge capacities.

In an embodiment, the interstices of the metastable $\zeta$-V$_2$O$_5$ nanowire include one or more quasi-one-dimensional tunnels configured to reversibly accept the one or more metal ions. In an embodiment, the one or more quasi-one-dimensional tunnels extend along the b axis of the lattice of the metastable $\zeta$-V$_2$O$_5$ nanowire. In an embodiment, the one or more quasi-one-dimensional tunnels extend perpendicular to a major axis of the metastable $\zeta$-V$_2$O$_5$ nanowire. In an embodiment, the one or more quasi-one-dimensional tunnels extend parallel to the major axis of the metastable $\zeta$-V$_2$O$_5$ nanowire. In an embodiment, the metastable $\zeta$-V$_2$O$_5$ nanowire has a unit cell angle, $\beta$, between about 108° and about 111°. In an embodiment, the unit cell angle, $\beta$, is the angle between the a and c axes of the metastable $\zeta$-V$_2$O$_5$ nanowire.

In an embodiment, the metastable $\zeta$-V$_2$O$_5$ nanowire has a smallest dimension between about 50 nm and about 1000 nm. As discussed further herein, smaller nanowire dimensions generally lead to faster metal ion insertion and extraction kinetics. Accordingly, such metastable $\zeta$-V$_2$O$_5$ nanowires having relatively narrow smallest dimensions are configured to have fast metal ion insertion and extraction kinetics.

In another aspect, the present disclosure provides a battery comprising a cathode comprising the metastable $\zeta$-V$_2$O$_5$ nanowires disclosed herein. In an embodiment, the cathode further comprises a conductive agent and a polymeric binder. In an embodiment, the nanowires are oriented to be parallel or perpendicular to the current collector.

In an embodiment, the battery further comprises an electrolyte solution or suspension comprising a metal ion. Such an electrolyte solution or suspension is configured to contact the cathode and serve as a metal ion source for the cathode. In this regard, the battery is configured to reversibly cycle the insertion and extraction of metal ions to and from the cathode of the present disclosure. In an embodiment, the electrolyte solution comprises an organic solvent and an alkyl-Mg solute. In an embodiment, the electrolyte solution is an aqueous dispersion of metal nanoparticles. In an embodiment, the electrolyte is a solid-state compound providing a high diffusivity of Mg-ions.

In an embodiment, the battery further comprises an anode. In an embodiment, the anode has an anode material selected from the group consisting of activated carbon cloth, graphite, Mg metal, a Mg alloy containing Mg, and an intermetallic compound containing Mg.

In another aspect, the present disclosure provides a method of making $\zeta$-V$_2$O$_5$ nanowires. In an embodiment, the method generally includes hydrothermally reacting a vanadium source (in one embodiment, a V$_2$O$_5$ source) and a silver source to provide $\beta$-Ag$_x$V$_2$O$_5$ nanowires; and hydrothermally reacting the $\beta$-Ag$_x$V$_2$O$_5$ nanowires in an acidic aqueous solution, thereby topochemically leaching Ag ions from the $\beta$-Ag$_x$V$_2$O$_5$ nanowires to provide $\zeta$-V$_2$O$_5$ nanowires. In an embodiment, a molar ratio between the V$_2$O$_5$ source and the silver source is about 3:1.

In an embodiment, the method further includes washing the $\zeta$-V$_2$O$_5$ nanowires with an aqueous solution of Na$_2$S$_2$O$_3$, thereby removing AgCl from the $\zeta$-V$_2$O$_5$ nanowires.

In another aspect, the present disclosure provides a method of making magnesiated metastable $\zeta$-V$_2$O$_5$ nanowires. In an embodiment, the method includes topochemically inserting Mg$^{2+}$ ions into $\zeta$-V$_2$O$_5$ nanowires. In an embodiment, topochemically inserting Mg$^{2+}$ ions into $\zeta$-V$_2$O$_5$ nanowires includes contacting the $\zeta$-V$_2$O$_5$ nanowires with an aqueous suspension of Mg nanoparticles. In an embodiment, topochemically inserting Mg$^{2+}$ ions into $\zeta$-V$_2$O$_5$ nanowires includes contacting the $\zeta$-V$_2$O$_5$ nanowires with an organic solution of alkyl-Mg or similar organomagnesium reactants.

In an embodiment, topochemically inserting Mg$^{2+}$ ions into $\zeta$-V$_2$O$_5$ nanowires includes contacting the $\zeta$-V$_2$O$_5$ nanowires with a Mg-ion electrolyte and applying a voltage to the Mg-ion electrolyte, thereby inserting Mg$^{2+}$ ions into the $\zeta$-V$_2$O$_5$ nanowires. In an embodiment, the Mg-ion electrolyte includes a solution of a Mg complex dissolved in a solvent. In an embodiment, the Mg-ion electrolyte includes a Mg complex dispersed within a conductive polymer. In an embodiment, the Mg-ion electrolyte is a solid-state compound with a high diffusivity of Mg-ions.

In an embodiment, the $\zeta$-$V_2O_5$ nanowires include $\zeta$-$V_2O_5$ nanowires disclosed elsewhere herein. In an embodiment, the magnesiated metastable $\zeta$-$V_2O_5$ nanowires have lattice constants comprising: a=15.30±0.4 Å, b=3.63±0.2 Å, and c=10.1±0.3 Å. In an embodiment, the magnesiated metastable $\zeta$-$V_2O_5$ nanowires have a unit cell angle, $\beta$, between about 108.9° and about 110.5°.

Figure 1:
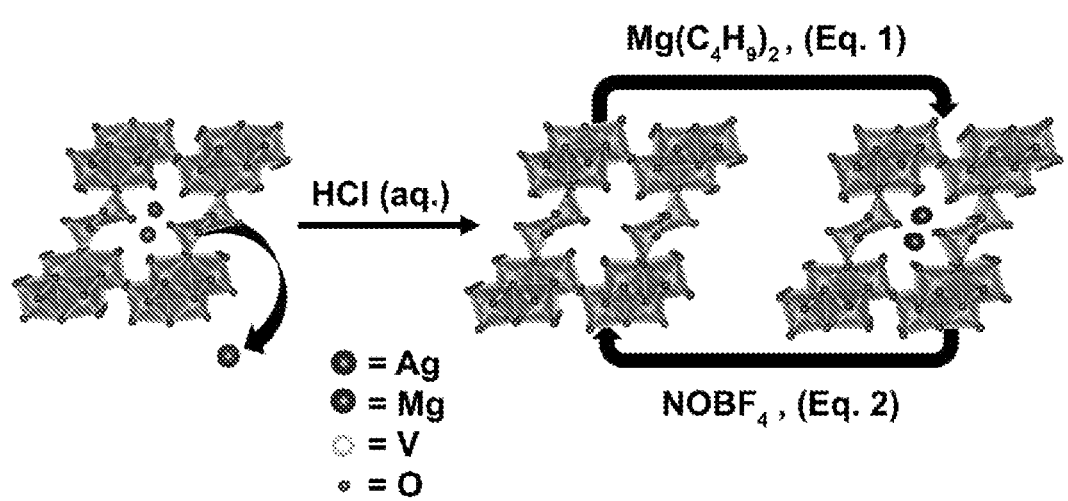
FIG. 1. Schematic illustration of reversible chemical intercalation of $Mg^{2+}$ in $\zeta$-$V_2O_5$. A ternary vanadium oxide bronze with a tunnel structure, $\beta$-$Ag_{0.33}V_2O_5$, is topochemically leached with HCl to stabilize an empty polymorph, $\zeta$-$V_2O_5$, under hydrothermal conditions with complete retention of the tunnel structure as per Eq. 1.

It has been well-established that topochemical reactions can serve as a useful analogue to related electrochemical processes.[55,56] FIG. 1 illustrates the approach utilized to synthesize the $\zeta$-$V_2O_5$ phase, as well as an approach to 'topochemical cycling' of the materials by first magnesiating the structure via reaction with di-n-butylmagnesium (a strong reducing agent) in heptane followed by demagnesiation via reaction with $NOBF_4$ (a strong oxidizing agent) in acetonitrile each with retention of the original oxide framework. The quasi-one-dimensional $\zeta$-$V_2O_5$ phase is a metastable open framework that is obtained by topochemical leaching of Ag ions from nanowires of a tunnel-structured $\beta$-$Ag_{0.33}V_2O_5$ phase[54] and has thus far not been stabilized in the bulk. Leaching of Ag ions with HCl yields an insoluble AgCl precipitate along with $\zeta$-$V_2O_5$ with the remnant Ag content greatly reduced to about 0.04 per formula unit of $V_2O_5$.[54] To obtain a phase-pure material for topochemical and electrochemical intercalation studies, the mixture is washed with an aqueous solution of $Na_2S_2O_3$ and as evidenced by powder diffraction in FIG. 8, which shows no evidence of AgCl residue. The geometric structure of the materials has been investigated by X-ray diffraction (FIG. 2). FIG. 2A depicts a high-resolution synchrotron powder diffraction pattern ($\lambda$=0.4136 Å) for the pristine $\zeta$-$V_2O_5$ material, including a refinement of the crystal structure. The sample used in this study has a residual Ag content of x≈0.06. The distinctive tunnel structure of $\zeta$-$V_2O_5$ has also been investigated by transmission electron microscopy, electron diffraction, and aberration-corrected scanning transmission electron microscopy (STEM), presented in FIG. 3. FIG. 3A shows a low-magnification TEM image of $\zeta$-$V_2O_5$, which elucidates the nanowire morphology; the electron diffraction pattern shown as an inset to FIG. 3A verifies the single-crystalline nature of the pristine nanowires. It is important to note that in this system, as shown in FIG. 3A, the growth direction of the nanowires is perpendicular to the one-dimensional tunnels. Hence, ion insertion and diffusion is expected to occur radially within these $\zeta$-$V_2O_5$ nanowires. The atomic-resolution high angle annular dark field (HAADF) image (FIG. 3B) confirms the structure solution of this metastable polymorph (FIG. 2(c)),[54] which is depicted in greater detail in FIG. S2. In this HAADF image, which is sensitive to Z-contrast, the vanadium atoms can be clearly imaged and the observed motif is reproduced well by the structural model of pristine $\zeta$-$V_2O_5$ along the [110] zone which is overlaid on the experimentally acquired image. This provides a direct view of the empty tunnels and verifies the structural assignment noted above. The nanowire growth direction as well as the spacing between V atomic columns is clearly marked on the atomic-resolution HAADF image presented in FIG. 3B.

The empty $\zeta$-$V_2O_5$ structure can subsequently be chemically magnesiated by both aqueous and non-aqueous routes.[54] In the former method, which was used to synthesize the sample generating the pattern depicted in FIG. 2B, the chemically-magnesiated phase is obtained by reaction with metallic Mg nanoplatelets in water.[54,57] It is crucial to note that the same pristine sample used to generate the pattern in FIG. 2A was chemically magnesiated and used to obtain the diffraction pattern in FIG. 2B. Thus, changes in the diffraction pattern from 2A to 2B can be directly attributed to the magnesiation reaction. The most significant difference between the diffraction patterns is a slight expansion in lattice parameters, indicative of insertion of the small Mg-ions into the 1D tunnels of $\zeta$-$V_2O_5$, further resulting in a change in volume from 522.96 to 525.63 Å³ (Table S1). The small change in volume is along the lines of predictions from DFT calculations, which suggest that the 3D rigid framework is not extensively deformed by topochemical insertion of Mg-ions.[16] A significant diminution in peak intensity for reflections from the {200} family of planes is observed upon Mg-ion intercalation; these planes bisect the two $\beta$-sites where the inserted cations reside; the significant decrease in peak intensity of the (200) reflection can be attributed to increased electron density within the tunnels upon insertion of Mg-ions nearing the theoretical stoichiometric limit of x=⅓ for this material, as determined by the space constraints of the lowest-energy empty $\beta$-site.[58] A similar diminution in the intensity of {111} reflections, which intersect the 1D tunnels is also observed. These changes to the diffraction profile suggest a topochemical expansion of the lattice to accommodate the intercalated Mg ions which reside within frustrated square-pyramidal sites as illustrated by the orange polyhedra in FIG. 2C, which are quite distinct from the seven-coordinated local geometries of Na and Ag ions in the isostructural Wadsley-type $\beta$-$M_xV_2O_5$ bronzes.[54,59,60] Notably, a five-coordinate local geometry is not preferred by Mg ions and this topochemically-stabilized structure thus enforces a somewhat "frustrated" local coordination sphere. The refined structure of $\beta$-$Mg_{0.331}V_2O_5$ (stoichiometry is determined by Rietveld refinement and confirmed by energy-dispersive X-ray spectroscopy) is shown in FIG. 2C and in further detail in FIG. 9. The details of the refinement, including atom positions (Table 1) and bond distances and angles (Table 2), are provided herein. Careful analysis of X-ray diffraction data obtained for $\zeta$-$V_2O_5$ nanowires magnesiated chemically in a non-aqueous medium as per Eq. 2, (FIG. 4) and those magnesiated electrochemically (FIG. 11) yield the same crystal structure as the one obtained by the refinement of those magnesiated chemically by the aqueous method, discussed above (FIG. 2).

Reversibility of $Mg^{2+}$ Insertion in $\zeta$-$V_2O_5$

Pristine $\zeta$-$V_2O_5$ can also be topochemcially magnesiated by direct reaction with di-n-butylmagnesium[56] in heptane solution under reflux as per Equation 2 shown above.

Subsequently, the inserted Mg-ions can be extracted from the $\beta$-$Mg_{0.33}V_2O_5$ structure (as well as from $\beta$-$Mg_{0.33}V_2O_5$ prepared under aqueous conditions) by treatment with a strong oxidizing agent, $NOBF_4$, in dry acetonitrile solution as per Equation 3 shown above.[61]

Figures 4A, 4B, 4C, 4D:
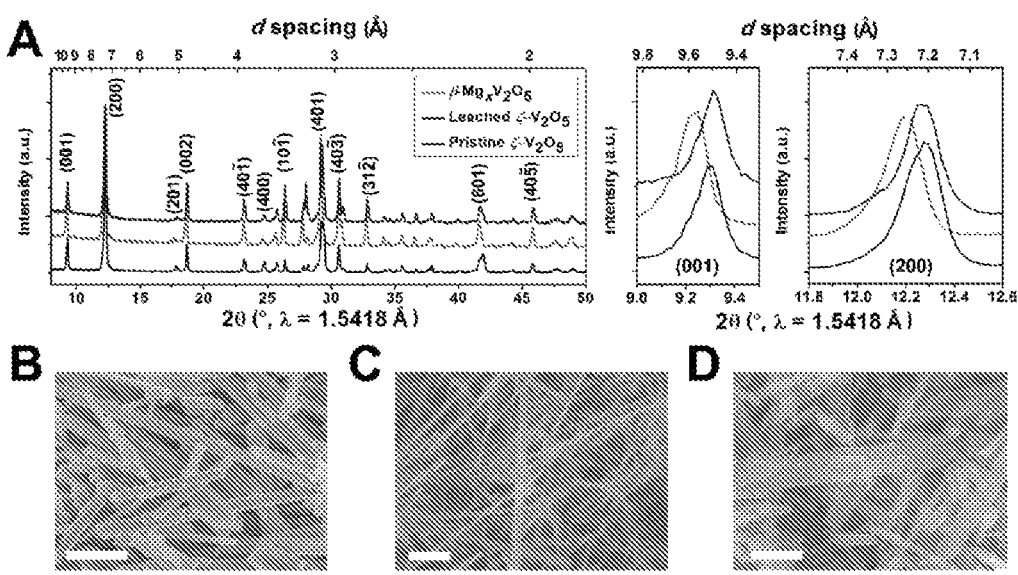

Characterization of the structure and morphology of the samples magnesiated as per Eq. 2 and demagnesiated as per Eq. 3 is depicted in FIG. 4. The structural change upon magnesiation/demagnesiation as observed in powder diffraction is manifest in a change in the 2θ position of the {001} and {100} families of reflections, as illustrated by the expanded views of the (001) and (200) reflections in FIG. 4A. The shift of both reflections to lower 2θ values upon magnesiation is consistent with expansion of the tunnels on $Mg^{2+}$ insertion. The restoration of the reflections to values near those of the pristine material indicates recovery of the pristine ζ-V$_2$O$_5$ structure upon NOBF$_4$ treatment and attests to the reversibility of the magnesiation process. A pronounced change in color from orange-yellow (characteristic of V$^{5+}$) to dark green (characteristic of mixed V$^{4+}$/V$^{5+}$) is observed upon magnesiation (FIG. 10). Importantly, the removal of the Mg ions is necessarily coupled to a re-oxidation of the V$_2$O$_5$ lattice, which brings about a reversion to an orange/yellow color. Energy dispersive X-ray spectroscopy analysis (EDX) is shown in FIG. 10 and corroborates that Mg-ions are indeed incorporated in and removed from the sample, respectively, necessitating that their introduction into the structure should lead to changes in structure of ζ-V$_2$O$_5$ as revealed by diffraction. Reaction as per Eq. 2 allows for nearly complete occupancy of the β-sites along the 1D tunnels. The Mg ions are furthermore almost entirely removed upon leaching with NOBF$_4$. It is important to note that, in contrast to other vanadium oxide materials wherein co-intercalation of water with Mg$^{2+}$ has been observed to increase the observed capacity of the material due to proton insertion,[24] no evidence has been observed of co-intercalation of water, hydronium ions, or hydrogen into the relatively spatially constrained quasi-one-dimensional tunnels of ζ-V$_2$O$_5$ as evidenced by a lack of spectroscopic signatures of water in X-ray absorption spectroscopy experiments (FIG. 7(A)).

The ζ-V$_2$O$_5$ materials prepared here have lateral dimensions of 149±5 nm and range several microns in length, consistent with previously reported dimensions for the precursor, β-Ag$_x$V$_2$O$_5$,[54] although their lengths are somewhat reduced due to grinding of the powders prior to topochemical magnesiation/demagnesiation. FIGS. 4D-4F indicate retention of morphology upon magnesiation/demagnesiation, attesting to the topochemical nature of this process and further suggesting a high degree of structural stability and the ability to mitigate strain induced by volume expansion (which is <1% based on the refinements above). It is important to note that because the one-dimensional tunnels are observed to grow perpendicular to the direction of wire growth, Mg$^{2+}$ diffusion occurs along the shortest dimension of the wires which is likely conducive to facilitating homogeneous magnesiation and demagnesiation by providing short diffusion path-lengths for the cations. The shorter diffusion pathlength enabled by the crystallographic growth orientation of the nanowires thereby helps to improve slow diffusion kinetics like those observed with orthorhombic V$_2$O$_5$.[21,23,62,63] Critically, despite the ~150 nm one-dimensional diffusion path lengths, meaningful finite size effects in other V$_2$O$_5$ phases have not been considered significant until dimensions are scaled to ~50 nm.[5] It is therefore likely that the behavior exhibited here more closely approximates 'bulk' behavior for this material, making nanostructuring of great importance in future endeavors for improving diffusion kinetics.

Electrochemical Mg$^{2+}$ Insertion in ζ-V$_2$O$_5$

The ζ-V$_2$O$_5$ nanowires were also electrochemically cycled in a Mg$^{2+}$ electrolyte using coin-type cells in a hybrid configuration at 50° C. (FIG. 5). As a comparison, the topochemical synthesis was performed at room temperature for the aqueous method and 98° C. for the non-aqueous method. The first discharge cycle (FIG. 5A) shows a capacity of 140 mAh g$^{-1}$, which corresponds to the intercalation of 0.48 Mg$^{2+}$ per V$_2$O$_5$ unit, as opposed to 0.331 Mg$^{2+}$ observed for chemically discharged samples. This increased capacity observed for the first cycle is likely due to the decomposition of electrolyte at the cathode surface to form a solid electrolyte interphase (SEI) region and is evidenced by the poor Coulombic efficiency observed for the first cycle (55%). Despite the poor initial Coulombic efficiency, the discharge capacity is stabilized at 90 mAh/g (i.e., 0.31 Mg$^{2+}$) after 50 cycles. The observed capacity suggests magnesium intercalation during electrochemical cycling is very close to the expected maximum capacity of the crystallographic β-site (FIG. 17), which represents the most favorable intercalation site for the inserted cations.[16,28] This conclusion is consistent with crystallographic data collected for the topochemically magnesiated ζ-V$_2$O$_5$. Although the Coulombic efficiency was limited to 55% during the first cycle, likely due to the observed sluggish intercalation kinetics and electrolyte decomposition, especially during demagnesiation (charging), Continued cycling of the cell reduces the polarization of charging by 0.59 V and enhances Coulombic efficiency up to 84.2% for 100$^{th}$ cycle, suggesting that intercalation kinetics improve with increased cycling, likely due to a combination of interfacial stabilization and improved wetting of the composite electrode by the electrolyte. Such an abrupt increase in coulombic efficiency over the first several cycles is often observed as the solid-electrolyte interphase (SEI) layer is formed and then reconstituted, marking a pronounced decrease in the amount of parasitic, irreversible side reactions, which limit capacity in early cycling.[64] As the number of parasitic reactions decreases and SEI is stabilized, the accessible gravimetric capacity stabilizes at 90 mAh/g. This exceptional cycling stability is evidenced strikingly in FIG. 5B, which shows cycling performance and a stabilization of the capacity at 90 mAh/g after 85 cycles. A magnified view of powder XRD patterns in FIG. 5C (FIG. 11) further evidences the reversibility of the structural changes during electrochemical cycling (diffraction data collected following the initial discharge cycle). The similarities between the diffraction patterns of the topochemically and electrochemically prepared samples (FIGS. 4A, 5C, and 11) are striking and suggest that the two processes occur via the same mechanism, allowing structural insight deduced from the topochemically-prepared phase to be applied to that of the electrochemically-prepared phase. Upon magnesiation (discharge), the (001) reflection shifts to a lower 2θ value reflecting an expansion of the lattice due to a convolution of Mg$^{2+}$ insertion and vanadium reduction from the larger V$^{5+}$ to the smaller V$^{4+}$. An additional reflection is observed at a higher angle of 9.5° and possibly corresponds to stage-ordering phenomena wherein upon electrochemical insertion, specific tunnels are filled. Regardless of its crystallographic origin, the Mg-ion insertion is entirely reversible as the reflection disappears on demagnesiation, denoting a complete reversion to the original structure. Interestingly, upon charging, the (001) reflection returns to an angle higher than that of even pristine ζ-V$_2$O$_5$, likely due to the removal of the very small amount of residual silver within the empty tunnels of the pristine material under very high potential (ca. 0.04-0.06 Ag per V$_2$O$_5$).

The electrochemically-magnesiated ζ-V$_2$O$_5$ nanowires have also been investigated by transmission electron microscopy (TEM) techniques as depicted in FIG. 6 (collected following the initial discharge cycle). The atomic-resolution HAADF image (FIG. 6A) collected for the electrochemically-magnesiated ζ-V$_2$O$_5$ nanowires clearly identifies the V atomic framework. This image can be compared directly with the structural model of pristine ζ-V$_2$O$_5$ overlaid on the experimental image, which similarly shows only V atoms along the [110] zone axis. This verifies that these ζ-V$_2$O$_5$ nanowires retained their tunnel structure upon Mg-ion insertion, consistent with the high structural reversibility evidenced by the XRD data presented in FIGS. 4A and 11.

Figures 7A, 7B, 7C, 7D, 7E, 7F, 7G:
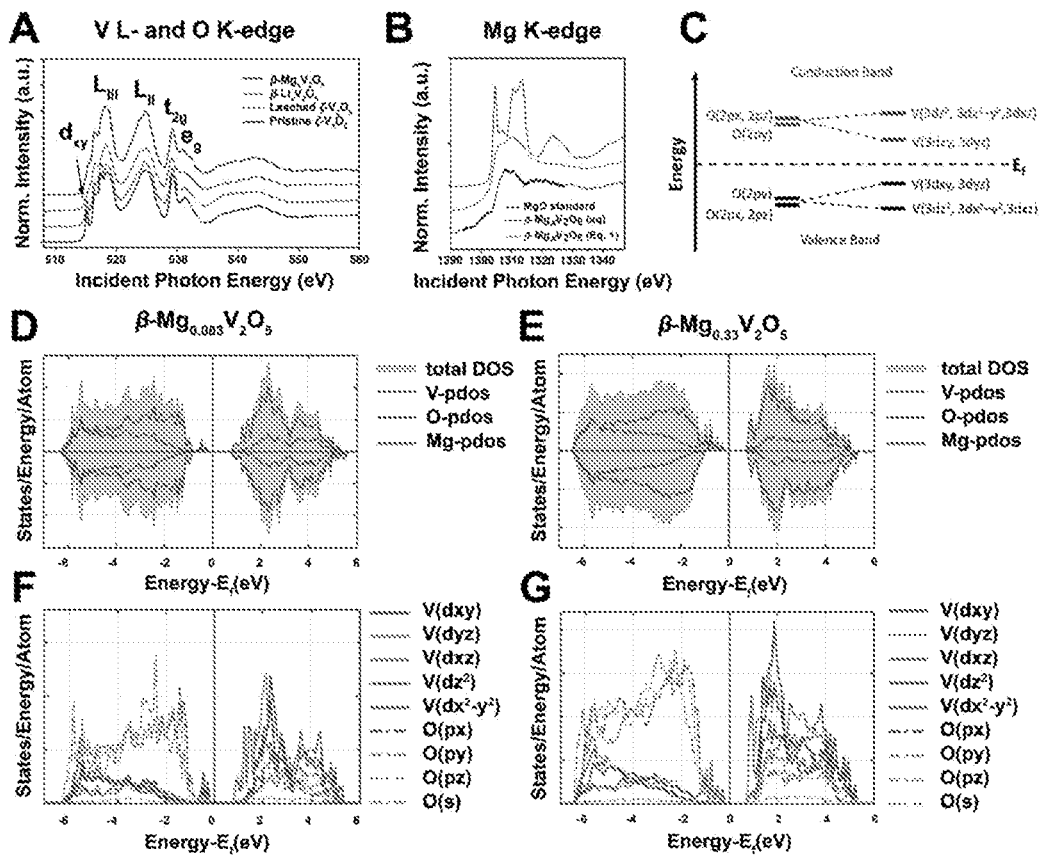

Evidence of Mg-ion intercalation is provided by EDX analysis. The atomic-resolution HAADF image from which the EDX line scan was collected is presented in FIG. 12A. This image was also acquired along the [110] zone axis. The EDX line scan spectrum presented in FIG. 12B was collected perpendicular to the tunnels along the z direction and shows clear spectroscopic evidence for Mg, confirming the presence of Mg within the tunnel sites. The integrated EDX spectrum corresponding to the same line scan is included in FIG. 12C. The spectrum shows a clear Mg signal (along with V and O, as anticipated). Integrating the intensities of the EDX spectrum suggests the concentration of Mg is ca. 4±0.4 atom %. This further corresponds to a stoichiometry in the range of $Mg_{0.26}V_2O_5$—$Mg_{0.32}V_2O_5$ upon electrochemical Mg-ion insertion. This value is also consistent with the extent of Mg-ion insertion levels deduced from the stabilized discharge capacity of 90 mAh/g after 50 cycles (FIG. 5A). The close agreement between the EDX-quantified Mg content within the tunnels, the gravimetric capacity deduced electrochemically, and Mg occupancy values obtained from Rietveld refinement for chemically-magnesiated samples is remarkable and indeed provides strong corroboration for topochemical Mg-ion intercalation. The presence of Mg and the perfect agreement between the three techniques further suggests that reversible Mg-ion insertion, rather than proton insertion as has been observed for layered vanadium oxides, is the sole origin of the observed capacity.[24] This is indeed further supported by the absence of distinctive water signature in the X-ray absorption spectra collected for the magnesiated samples (FIG. 7a). The rigorous confirmation of Mg intercalation within the structure, coupled with the excellent reversibility and structural stability further suggest that conversion reactions between Mg and $\zeta$-$V_2O_5$ are not a serious issue as observed for other oxide cathode materials.

Figures 14A, 14B, 14C, 14D, 14E, 14F:
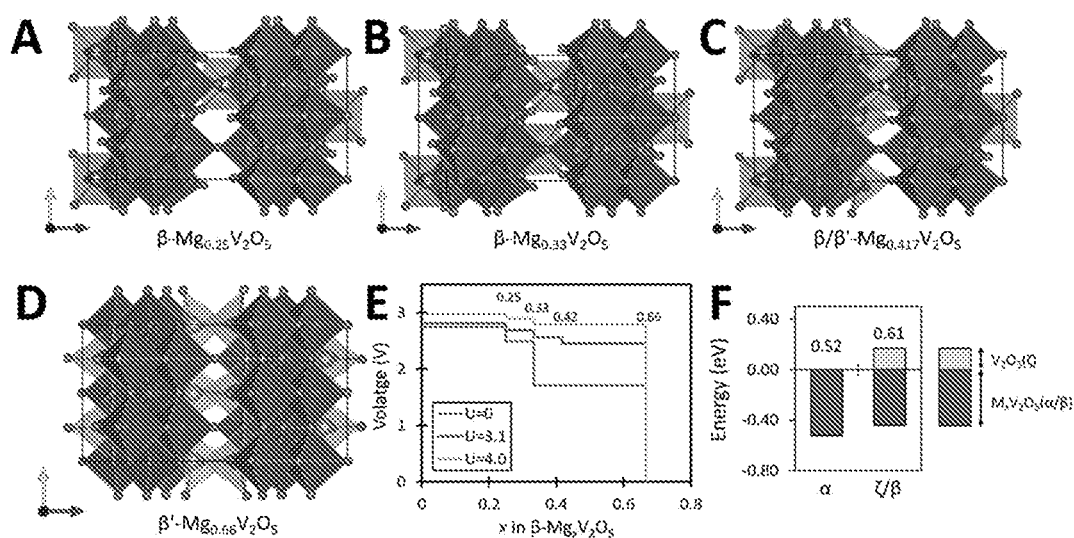

The large hysteresis in the electrochemical curves (FIG. 5(A)) complicates the definition of a value of equilibrium potential. An average voltage of 1.65 V vs $Mg^{2+}/Mg^0$ is determined by simply taking the average of the values at which Mg insertion and de-insertion were observed in FIG. 5A, as measured in plots of the corresponding first derivative (dQ/dV, FIG. 113). This average value is not the true equilibrium voltage, which, nonetheless, should be located somewhere between the experimental values measured on discharge (~1.2 V versus) $Mg^{2+}/Mg^0$) and charge (~3.1 V), respectively. Deviations from the equilibrium value are typically ascribed to kinetic limitations, for instance, in interfacial charge transfer or bulk diffusion. The equilibrium voltage can be computed ab initio using DFT, as demonstrated for $\alpha$-$V_2O_5$, where reasonable agreement with experiments has been observed.[16,65] Since first-principles-computed voltages are strongly dependent on the degree of electron localization in these strongly correlated systems, computations were carried out for $Mg_xV_2O_5$ with different values of the on-site Coulomb and exchange interaction parameter, U. The calculated voltage increases with increasing value of U (i.e., increasing electron localization) when x>0.2, with calculated voltages ranging from ~2.9 V for U=4.0 to ~1.6 V for U=0 (FIG. 14e). All these calculated values fall between the experimental bounds observed for discharge and charge, making them consistent with the experiments. Asymmetric deviations from the equilibrium value indicate that the kinetics of charge and discharge are different, which is not uncommon in electrochemical reactions. The fact that the charge potential decreases to ~2.55 V upon subsequent cycles indicates that values of lower U provide better representations of the experimental observations. For further comparison, FIG. 14f compares the difference in chemical potential for $\zeta$ and $\alpha$ polymorphs of $V_2O_5$. Despite the greater stability of the magnesiated $\zeta$-$V_2O_5$ phase relative to magnesiated $\alpha$-$V_2O_5$, the metastability of empty $\zeta$-$V_2O_5$ results in a larger potential difference between empty and magnesiated phases for $\zeta$-$V_2O_5$ (0.52 eV for $\alpha$-vs. 0.61 eV for $\zeta$-$V_2O_5$).

Electronic Structure Underpinnings of the Facile Magnesiation of $\zeta$-$V_2O_5$ Cation insertion into a cathode framework necessitates concomitant reduction of the transition metal center to maintain charge balance. In the case of $\zeta$-$V_2O_5$, the oxidation state is expected to change from exclusively $V^{5+}$ to mixed valence $V^{5+}/V^{4+}$, making a detailed study of its electronic structure necessary both for confirming Mg-ion insertion and for explaining electronic contributions to facile diffusion. As such, the electronic structure of this material has been studied as a function of topochemical insertion and extraction and electrochemical cycling. Scanning transmission X-ray microscopy (STXM) has been used as a spectrally and spatially resolved probe of the unoccupied density of states of the empty $\zeta$-$V_2O_5$ precursor nanowires, chemically-magnesiated $\beta$-$Mg_{0.331}V_2O_5$ nanowires (Eq. 2), and the chemically de-intercalated nanowires (Eq. 3). FIG. 7 depicts integrated V $L_{2,3}$-edges and O K-edge X-ray absorption spectra acquired for individual nanowires of each sample; a spectrum acquired for a lithiated $\beta'$-$Li_{0.66}V_2O_5$ nanowire is also shown alongside for comparison. The absorption features correspond to transitions of core electrons from V 2p to partially occupied and unoccupied V 3d states at the V $L_{2,3}$-edges and from O 1s to partially unoccupied or unoccupied O 2p states at the O K-edge.[53,66-68] Life-time broadening, due to a Coster-Kronig Auger decay process, which fills the X-ray excited $2p_{1/2}$ hole with a $2p_{3/2}$ electron, renders the V $L_{II}$ edge less informative; however, the V $L_{III}$ edge (immune to this process) displays fine-structure, which can be assigned based on previous electronic structure calculations as well as with analogy to measurements for orthorhombic $\alpha$-$V_2O_5$.[41,53,66]-68 These features comprise transitions from the singlet V $2p^63d^0$ into V $2p^53d^1$ states split predominantly by crystal field (and also potentially by multiplet) effects. FIG. 7 depicts calculated atom- and orbital-projected density of states for low and high concentrations of magnesium occupancy, x, in $\beta$-$Mg_xV_2O_5$. The electronic structure can be understood with reference to FIG. 7C, which provides a schematic depiction of the hybridization of the V 3d orbitals and O 2p orbitals in the valence and conduction bands. FIGS. 7D and 7E suggest that the valence band is derived primarily from O 2p states, whereas the conduction band is primarily V 3d in origin. $\zeta$-$V_2O_5$ has three separate crystallographically inequivalent vanadium atoms; however, the conduction band edge primarily comprises V $3d_{xy}$ states derived from one of the vanadium atoms (the V $3d_{xy}$ states for the other two vanadium atoms are slightly higher in energy) although these states are not split-off from the rest of the conduction band as in $\alpha$-$V_2O_5$. Transitions to V $3d_{xy}$ and the next higher energy V $3d_{yz}$ states are clearly resolved as absorption features at the V $L_{III}$-edge in the spectrum acquired for $\zeta$-$V_2O_5$ nanowires, shown in FIG. 7A. Upon insertion of Mg-ions (as well as for Li-ions), FIG. 7A indicates a greatly diminished intensity of the first two absorption features at 515 and 516.4 eV at the V$L_{III}$-edge arising from Pauli state blocking as the lowest-lying conduction band states are filled by electrons from the ionized cations. As also observed for lithiation of $\alpha$-$V_2O_5$,[16,69] the filling of these states provides direct evidence for local reduction of pentavalent vanadium sites. Remarkably, upon chemical de-intercalation using NOBF$_4$, these states are recovered and indeed the ζ-V$_2$O$_5$ precursor and the chemically demagnesiated sample show strikingly similar spectroscopic signatures. This recovery of electronic structure (as also evidenced by recovery of the orange-yellow coloration, compare FIG. 10a and FIG. 10c) following de-insertion is indicative of near complete extraction of the Mg-ions and corroborates the overall reversibility of the process. The similarities between β-Mg$_x$V$_2$O$_5$ and β'-Li$_{0.66}$V$_2$O$_5$ are also compelling at the V L- and O K-edge, and are explicable given that both materials have the same nominal vanadium oxidation state (V$^{5+}$: V$^{4+}$ of ca. 2:1), and are nearly isostructural, save for the crystallographic positions of the diffusing ions (β sites in Mg$_x$V$_2$O$_5$ as compared to β' sites shifted down the 1D tunnel by half a unit cell length in Li$_{0.66}$V$_2$O$_5$).[54,58,70] The localized reduction of vanadium sites is further corroborated by vanadium K-edge XANES spectroscopy. The spectra displayed in FIG. 15 were collected between 5355-5765 eV for pristine ζ-V$_2$O$_5$, and β-Mg$_x$V$_2$O$_5$ magnesiated to two different extents (low extent of magnesiation, where $x_{intended}$=0.2 and high extent of magnesiation, where x=0.33). V K-edge measurements are particularly sensitive to vanadium oxidation state. In particular, the peak centroid position and peak intensity of the pre-edge feature centered at ~5470 eV is critically sensitive to vanadium oxidation state and local V coordination environment.[69] The observed shift of the peak centroid to lower energies is monotonic with increasing magnesiation and is direct evidence of decreasing local oxidation state of the vanadium within the lattice (the peak position of this feature in VO, which is exclusively V$^{4+}$ is centered ~2 eV below that of V$_2$O$_5$).[25] The monotonic decrease in vanadium valence state with increasing concentration of magnesium source (di-n-butylmagnesium), where solvent water levels are held constant at <20 ppm, strongly suggests that vanadium reduction is due to further Mg$^{2+}$ insertion into the lattice rather than parasitic proton insertion within the tunnels as has been observed in α-V$_2$O$_5$.[24]

The O K-edge XAS spectra reflect transitions of O 1s core electrons to O 2p states, which, in turn, are hybridized with V 3d states and, thus, reflect their crystal field splitting. FIG. 7 also suggests that there is no substantial Mg—O hybridization, as has been observed for other M$_x$V$_2$O$_5$ bronzes.[71] Upon magnesiation, the changes in the O K-edge can be understood with respect to the orbital projected density of states plotted in FIGS. 7F and 7G. The O K-edge XANES for ζ-V$_2$O$_5$ is split into two separate manifolds centered at ca. 529.2 and 531.2 eV, which can be attributed to transitions to V3d-O2p hybrid states of $t_{2g}$ and $e_g$ symmetry corresponding to π and end-on σ-interactions, respectively. Upon insertion of Mg-ions, FIG. 7 suggests a diminished spectral weight for the $t_{2g}$ peaks and a broader energy dispersion. These spectral changes can be directly correlated to Mg-ion intercalation. FIGS. 7F and 7G indicate that upon magnesiation, the low-lying V3d$_{xy}$ and 3d$_{yz}$ states are filled and give rise to 'mid-gap' states, resulting in loss of spectral intensity from the $t_{2g}$ manifold. Furthermore, the structural distortion induced by magnesiation yields a distinctive crystal field splitting pattern wherein the V 3d$_{xz}$ states appear at energies intermediate between the $t_{2g}$ (V3d$_{xy}$ and 3d$_{yz}$) and $e_g$ (V3d$_{z^2}$ and 3d$_{x^2-y^2}$) levels. This splitting pattern is reflected in a broader spread of energies and decreased separation between the $t_{2g}$ and $e_g$ peaks. It is worth noting that the well-resolved two-peak line-shape for ζ-V$_2$O$_5$ is again completely recovered at the O K-edge upon extraction of the Mg-ions by treatment with NOBF$_4$ (FIG. 7A). Moreover, spectroscopic signatures of intercalated water observed for V$_2$O$_5$ xerogels or hydrated Sr-ions intercalated between double-layered V$_2$O$_5$ slabs are not observed[71] further indicating that de-solvated and bare Mg$^{2+}$, rather than hydrated Mg$^{2+}$, are the intercalating species. Additionally, Mg K-edge XANES spectra (FIG. 7B), calibrated with respect to a MgO standard, show resonances characteristic of divalent magnesium as observed in prior Mg K-edge XAS studies.[72,73] The relative broadness of the resonances stems from the facile diffusivity of Mg-ions in these compounds, which thereby yield a broad range of local environments. First-principles calculations of Mg K-edge spectra are thus far not available for these compounds but it appears that the samples intercalated by reaction with di-n-butylmagnesium show greater structure and are better ordered, which might be a result of the higher temperature of the latter process.

The electrochemically-magnesiated samples were also analyzed by electron energy loss spectroscopy (EELS), presented in FIGS. 6B and 6C (data collected after X cycles). A comparison of EEL spectra between pristine and electrochemically-magnesiated ζ-V$_2$O$_5$ is provided. The EELS data for the electrochemically-magnesiated ζ-V$_2$O$_5$ was extracted from three areas probed during a linescan, as indicated in the HAADF image in FIG. 6B. The O K-pre-edge showed a sharp feature in the case of the pristine EEL spectrum, which lost intensity in case of the electrochemically-magnesiated sample. Furthermore, the ratio of the two peaks at 531 and 533 eV corresponding to $t_{2g}$ and $e_g$, respectively, inverts upon magnesiation, which is consistent with studies on the electronic structure of V$_2$O$_5$ on lithiation. It has previously been reported[74] that the relative intensity of O K- pre-edge compared to V L$_{III}$ edge increases linearly with the valence of vanadium. Hence, the decreased intensity when moving from the pristine to the electrochemically-magnesiated sample indicates a reduction of the compound, consistent with a true Mg$^{2+}$ insertion reaction. It is also consistent with the XAS data presented in FIG. 7, wherein loss of spectral intensity from the $t_{2g}$ manifold of O K- edge can be seen going from the pristine to the chemically-magnesiated ζ-V$_2$O$_5$ sample, further confirming the similarities between the chemical and electrochemical processes reported here. An interesting aspect of the magnesiation of ζ-V$_2$O$_5$ is the appearance of hybrid V—O 'mid-gap' states that evolve 0.5 eV below the Fermi level, and are completely absent in empty ζ-V$_2$O$_5$. At low Mg-ion concentrations, the midgap state primarily has V 3d$_{xy}$ and O p$_{x/y/z}$ hybrid character. With increasing magnesiation, the mid-gap state takes on significant V d$_{yz}$ character and overlaps with the valence band, thus greatly reducing the band-gap. The eventual degeneracy of the V 3d$_{xy}$ and 3d$_{yz}$ states is in marked contrast to α-V$_2$O$_5$, where lithiation or magnesiation yields distinct polaronic states within the bandgap[16,41] that are derived exclusively from the non-degenerate V 3d$_{xy}$ states. In other words, electron localization and formation of small polarons is partially mitigated in ζ-V$_2$O$_5$ by the increased overlap of the V 3d$_{xy}$ and 3d$_{yz}$ states in this material as compared to α-V$_2$O$_5$.

Much attention has been paid in the literature to rationalizing the sluggish solid state diffusion kinetics of Mg$^{2+}$ relative to Li$^+$ solely in terms of the increased polarization of the cathode lattice owing to the increased charge to radius ratio ("hardness") of the divalent Mg-ion.[13] Surely, this increase in polarizing ability represents a serious fundamental impediment and contributes a great deal to the frequently reported slow diffusion kinetics; however, the sluggish diffusion kinetics cannot be described in their entirety solely by the 'hardness' of the Mg-ion. The diffusion of an inserted charged species can be separated into two components: the diffusion of the cationic species through the lattice and the concomitant diffusion of the electron through specific hybrid states of the cathode lattice (which in transition metal oxides is closely coupled to specific phonon modes i.e., a polaron);[41,75,76] The diffusion of $Mg^{2+}$ is thus intrinsically coupled to polaron diffusion due to self-trapping of the $Mg^{2+}$ ions in stabilized polaronic wells. This complexity can be understood by analogy with the impact of Li-ion polaron diffusion in $\alpha\text{-}V_2O_5$.[41] In this structure, polaron diffusion is intrinsically coupled to the diffusion of lithium, which stabilizes the polaron when in close proximity; this is to say that the polaron is stabilized energetically when localized on a vanadium adjacent to the intercalated $Li^+$, but destabilized when moving away from the $Li^+$.[41] The stabilization of the polaron on vanadium atoms adjacent to the $Li^+$ thereby necessitates concomitant diffusion of the pair polaron-cation pair. As mentioned above, due to the increased overlap of the V $3d_{xy}$ and $3d_{yz}$ states in the metastable material $\zeta\text{-}V_2O_5$ (as compared to in $\alpha\text{-}V_2O_5$) the strength of self-trapping of the cation by the polaron is substantially mitigated in the metastable $\zeta\text{-}V_2O_5$. This is evidenced quantitatively by the decreased diffusion barriers for the polaron formed upon lithiation of metastable $\zeta\text{-}V_2O_5$ (236 meV, FIG. 16) as compared to the thermodynamically stable $\alpha\text{-}V_2O_5$ (340 meV)[41] when the polaron is stabilized in close proximity to the inserted cation. Additionally, when comparing the diffusion of a single polaron in $\zeta\text{-}V_2O_5$ (due to $Li^+$ insertion) and a bipolaron in $\zeta\text{-}V_2O_5$ (due to $Mg^{2+}$ insertion, localized on the V1/V2 or V2/V3 sites, Table 3, the migration barrier is increased for the bipolaron from 236 meV to 264 meV (FIG. 16). This increase in polaron migration barrier for $Mg^{2+}$ insertion, albeit modest, in turn leads to a larger structural relaxation and a much greater tendency towards self-trapping of the diffusing $Mg^{2+}$ species. As such, there are two distinct origins for improved $Mg^{2+}$ diffusion observed here: increased covalency of the metastable $\zeta\text{-}V_2O_5$ polymorph (similar to the use of sulfides) helps to screen the highly-polarizing $Mg^{2+}$ charge as it diffuses; alternatively, the strength of polaronic wells is weakened given the vanadium-oxygen connectivity and thus the polaron migration barrier can be diminished thereby reducing the tendency towards self-trapping of the diffusion species observed in $\alpha\text{-}V_2O_5$. In this way, varying the metal-ligand connectivity within a structure can alter the degeneracy of orbitals, improve d-orbital overlap, diminish polaron diffusion barriers, and therefore ultimately improve $Mg^{2+}$ diffusion.

Elucidation of the Chemical and Structural Origins of $Mg^{2+}$ Diffusion in $\zeta\text{-}V_2O_5$ The rather sparse selection of frameworks that allow for reversible insertion of $Mg^{2+}$ represents a major stumbling block in the development of Mg batteries. The predictive discovery of such materials has not been intuitive, and many materials initially considered to have been good Mg-ion intercalation hosts have now been abandoned. The sum of the evidence presented here shows that $\zeta\text{-}V_2O_5$ is able to reversibly accommodate Mg-ions within its unique 1D tunnels. Remarkably, the insertion and extraction of $Mg^{2+}$ is accompanied by a complete retention of crystal structure and symmetry with a minimal volume change of <1% on Mg-ion insertion. The retention of crystal structure and minimal volume expansion is further accompanied by complete retention of the observed nanowire morphology, confirming a truly topochemical intercalative mechanism. A general lack of rigorous characterization of discharge products and the precise nature of reported capacity in previous scientific literature reports renders a direct comparison of the performance and merits of various cathode materials challenging.

In many of the reported $Mg^{2+}$ cathode materials, Mg-ion insertion has not been proven rigorously by local chemical analysis methods (e.g. STEM, EDX, XANES or refinement of Mg occupancies) and there remain considerable questions in several cases as to the role of water as a co-intercalant. Nevertheless, a stark contrast is evidenced between the tunnel-structured metastable $\zeta\text{-}V_2O_5$ and the thermodynamically stable single-layered $\alpha\text{-}V_2O_5$, which has so far been identified as a poor candidate for Mg-ion intercalation.[13,36] Specifically, $\zeta\text{-}V_2O_5$ exhibits a very high capacity 90 mAh/g after 100 cycles, which can be compared with a value of 75 mAh/g reported for $\alpha\text{-}V_2O_5$ in dry electrolyte after just 10 cycles[24] or a value of 47 mAh/g in a wet electrolyte for the xerogel phase of $V_2O_5$ after 10 cycles.[26] Despite the difficulty in directly comparing electrochemical measurements, the results described here represent a significant improvement over the reported performance of other $V_2O_5$ polymorphs. The reported capacity and cycle stability are furthermore comparable to capacities reported for $MnO_2$ (100 mAh/g @20 cycles)[77] and $Mg_xMo_6O_8$ (60 mAh/g @2000 cycles).[63] For reference, previously reported performance values for several proposed Mg-ion cathode materials are included in Table 4.

The markedly improved Mg-ion capacity observed in the metastable $\zeta\text{-}V_2O_5$ polymorph can be attributed to a combination of several factors. First, FIG. 2C confirms a square-pyramidal $MgO_5$ local coordination sphere as predicted by DFT calculations, as depicted in FIG. 17.[16] Because of the open tunnel-structured framework of the $\zeta\text{-}V_2O_5$ structure, there are several possible sites that inserted cations can occupy.[28] For smaller cations, two of these sites are relevant at low values of x in $M_xV_2O_5$: the $\beta$ and $\beta'$ sites, which correspond to coordination environments defined by five and four oxygen atoms, respectively. Nudged elastic band calculations indicate that the diffusing $Mg^{2+}$ traverse a pathway between these two sites through a trigonal planar transition state. These coordination sites and their specific location within the $\zeta\text{-}V_2O_5$ structure are depicted in FIG. 17B. This pathway represents the lowest-energy diffusion pathway within this structure and, most importantly, requires only a minimal change in formal coordination number along the pathway from the 5-coordinate $\beta$-site through a 3-coordinate transition state, and finally to the 4-coordinate $\beta'$ site. In the next half of the pathway, the $Mg^{2+}$ diffuses from the 4-coordinate $\beta'$ site to an adjacent $\beta$ site again passing through a 3-coordinated transition state. FIG. 17 thus illustrates the following sequence: $\beta$ (5-coordinate)→(3-coordinate transition state)→$\beta'$ (4-coordinate)→(3-coordinate transition state)→$\beta$ (5-coordinate). As cations diffuse, they must overcome multiple activation energy barriers across the energy landscape. From a perspective of cathode materials design, minimizing the change in formal coordination environment is thus critical for improving diffusion kinetics and limiting self-trapping of the diffusing cations. The benefit of this small change in coordination number is particularly stark when viewed in contrast to the change in coordination number for diffusing $Mg^{2+}$ in $\alpha\text{-}V_2O_5$. In $\alpha\text{-}V_2O_5$, the $Mg^{2+}$ diffuses along a pathway between an 8-coordinate environment through a 3-coordinate transition state before settling back into the same highly-favored 8-coordinate environment, as depicted in FIG. 17a. The diffusion pathway for $\alpha\text{-}V_2O_5$ can be summarized as: 8-coordinate→3-coordinate transition state→8-coordinate. It should be noted that the trigonal planar transition state in $\zeta\text{-}V_2O_5$ is much broader than the similar 3-coordinate transition state in $\alpha\text{-}V_2O_5$.[16] Notably, none of the coordination environments depicted in FIG. 17B for $\zeta\text{-}V_2O_5$ are particularly desirable for $Mg^{2+}$, illustrating the idea of frustrated coordination.[16] The ability of this structure to enforce frustrated coordination promotes facile diffusion of Mg ions through the tunnels. In contrast, considering $Mg^{2+}$ within $\alpha$-$V_2O_5$ ($8\rightarrow3\rightarrow8$), the ions can be readily ensconced in stable eight-coordinated environments,[36] from which they are difficult to dislodge. Restated, the 1D $\zeta$-phase structure, which does not crystallize with Mg ions within the tunnel under thermodynamic conditions (i.e. $\beta$-$Mg_xV_2O_5$ cannot be synthesized directly), forces diffusing $Mg^{2+}$ ions into typically unfavorable sites, thereby raising the site energy of the "frustrated" sites and facilitating diffusion. It is posited that this is a direct result of the metastable character of this compound. FIG. 7 points to a second electronic origin of the facile diffusivity of Mg-ions in $\zeta$-$V_2O_5$. The increased energetic degeneracy and energy dispersion of V3d states (FIGS. 7F and 7G) and the elimination of the split-off conduction band characteristic of $\alpha$-$V_2O_5$[41,53] results in increased charge delocalization and substantially mitigates polaron formation. The $\zeta$-$V_2O_5$ polymorph has consequently been shown to be more covalent relative to $\alpha$-$V_2O_5$, which exhibits relatively more ionic character as evidenced by the relative $t_{2g}/e_g$ ratios of the two polymorphs observed in V L-edge XAS measurements.[53] This is significant, because the greater degree of covalency for molybdenum-sulfur bonds relative to the typically more ionic nature of the metal-oxide bonds has been cited as an effective way to screen the charge of diffusing $Mg^{2+}$ and as the primary origin of faster Mg-ion diffusion kinetics observed in the molybdenum sulfide cluster-based Chevrel phases.[6,43,44] From a thermodynamic perspective, the metastability of the $\zeta$-$V_2O_5$ polymorph contributes to an ab initio calculated voltage larger than that calculated for the thermodynamically stable $\alpha$-$V_2O_5$ and leads to an average operating voltage located above 1.65 V vs. $Mg^{2+}/Mg^0$ (FIG. 5), which represents an improvement with respect to the low operating voltages which have been a drawback of the Chevrel phases (ca. 1 V). While the electrode reaction is viable and remarkably reversible, the insertion kinetics are somewhat sluggish, as hinted by the large hysteresis in potential between charge and discharge. It is likely that smaller particle sizes may mitigate this issue. Indeed, further reducing the diffusion path length of $Mg^{2+}$ in this material will be imperative for realizing the full potential of $\zeta$-$V_2O_5$ as a Mg-ion cathode material.

EXAMPLES

Example 1

Topochemical Mg-Ion Insertion and Extraction in $\zeta$-$V_2O_5$.

Pristine $\zeta$-$V_2O_5$ nanowires were synthesized by an adaptation of a previous approach, which here is modified to include a necessary procedure for removing the insoluble AgCl byproduct.[54] Topochemical insertion of Mg into pristine $\zeta$-$V_2O_5$ was achieved by two separate routes. First, aqueous magnesiation was performed by reacting $\zeta$-$V_2O_5$ with stoichiometric amounts of Mg nanoparticles[57] in water (Eq. 1). A second, non-aqueous magnesiation route (Eq. 2) was also used wherein the $\zeta$-$V_2O_5$ nanowires were allowed to react with stoichiometric amounts of di-n-butylmagnesium in heptane, under reflux for 24 h. Finally, chemical leaching of Mg-ions from the chemically-magnesiated phases was accomplished by reacting the $\beta$-$Mg_xV_2O_5$ nanowires with an excess of $NOBF_4$ (Eq. 3).

Example 2

Structural Characterization

High-resolution powder XRD data for the topochemically leached $\zeta$-$V_2O_5$ and for $\beta$-$Mg_xV_2O_5$ were obtained at beamline 11-BM of the Advanced Photon Source at Argonne National Laboratory ($\lambda$=0.4136860). Rietveld refinement of the collected data was performed using the GSAS/EXPGUI software suite.[78] Unit cell parameters, atom positions, thermal parameters, and site occupancies were refined and are listed in Table 1. All structural images depicted were generated using the VESTA software suite.[79] More details concerning data collection and processing by Rietveld refinement are herein. TEM images and electron diffraction patterns were acquired using a JEOL JEM 3010 operated at 300 keV. The STEM images, EELS and EDX data were acquired with a probe-side aberration-corrected JEOL JEM ARM200CF with a cold field emission gun operated at 200 keV. Further details for the STEM, EELS, and EDX conditions are provided herein.

Example 3

X-Ray Absorption Spectroscopy and Microscopy

STXM measurements were performed at the SM (10-ID1) beamline of the Canadian Light Source (CLS), a 2.9 GeV third-generation synchrotron facility. Right circularly polarized X-rays, generated by an elliptically polarized undulator (EPU), were used in the experiments. A 25 nm outermost-zone zone plate was used to obtain a diffraction-limited spatial resolution better than 30 nm. A 500 line $mm^{-1}$ plane grating monochromator (PGM) was used to acquire the V L-edge and O K-edge spectral stacks. Ensemble Mg K-edge X-ray absorption near-edge structure (XANES) spectra were collected in the energy range between 1290-1350 eV at the resonant elastic and inelastic X-ray scattering (REIXS) beamline (10ID-2) using the X-ray emission spectroscopy end-station at the Canadian Light Source (CLS). Further details concerning both STXM and REIXS beamline optimization and calibration, as well as data processing techniques are detailed in herein. Microprobe measurements at the V K-edge were performed at the Advanced Light Source (ALS) bending magnet beamline 10.3.2 (2.4-17 keV) with the storage ring operating at 500 mA and 1.9 GeV.

Example 4

Preparation of Electrodes and Electrolyte for Electrochemical Cycling of $\zeta$-$V_2O_5$ The $\zeta$-$V_2O_5$ powder was first thoroughly mixed with acetylene black as a conductive agent and a polymeric binder to form a slurry. The slurry was coated on an aluminum foil substrate and dried overnight. The electrolyte employed here was a mixture of 0.2 M Magnesium bis (trifluoromethylsulfonyl)imide $(Mg(TFSI)_2)$ salt and propylene carbonate as the solvent. The make-up of the binder solution, precise slurry composition, and electrode preparation methodology are described in detail herein.

Example 5

Fabrication and Test of Electrochemical Cells

Activated carbon cloth was used as the anode for the electrochemical cells. The activated carbon cloth (ACC) was dried under vacuum at 80° C. overnight. The high specific surface area of ACC (ca. 2000 $m^2\ g^{-1}$) gives rise to sufficient double-layer charging within the electrolyte's voltage stability window to match the charge for the cycling of the cathodes. Coin-type cells were fabricated by stacking the cathode and anode separated by glass fiber (VWR, grade 691, 210 μm thick) soaked with the electrolyte. A multichannel potentiostat (VMP3, Bio-Logic) was used for the electrochemical tests. The potential of the cathode was calibrated by considering the AC anode's potential, which is originally 2.2 V vs Mg/Mg$^{2+}$ and linearly proportional to the state-of-charge. An oven with forced-convection (BINDER) was used to fix the temperature of the cells to 50° C. The discharge-charge current was set to 6 mA g$^{-1}$ (or 7.9 μA cm$^{-2}$), which corresponds to C/50 rate, considering the low diffusivity of Mg$^{2+}$ ions in the oxides. The limit potential for discharge and charge was set to 0.2 V and 3.4 V versus Mg/Mg$^{2+}$, respectively, to characterize the material's capability to intercalate Mg$^{2+}$ as completely as possible in the presence of the large polarization shown in FIG. 5A.

Example 6

Electronic Structure Calculations

Electronic calculations were performed using the density functional theory (DFT)[80,81] method as implemented in Vienna ab initio Simulation Package (VASP).[82] The electron-exchange correlation was accounted for using the Perdew-Burke-Ernzerhof (PBE) formulation of the generalized-gradient approximation (GGA).[83] An on-site Hubbard U potential of 4.0 eV was used for the vanadium centers as benchmarked in previous studies.[16,84] Electron-ion interactions were incorporated using projector-augmented waves (PAW) with a kinetic energy cutoff of 600 eV. In the total energy calculations, a Monkhorst-packed reciprocal space grid of 4×4×4 k-points for the unit cells and 2×2×2 k-points for the supercells was used for sampling the first Brillouin zone.

Example 7

Synthesis of Pristine ζ-$V_2O_5$, Topochemical Cycling, and Stabilization of β-$Mg_xV_2O_5$ Pristine ζ-$V_2O_5$ nanowires were synthesized by an adaptation of a previously reported approach involving the topochemical leaching of Ag from within the tunnels of β-$Ag_{0.33}V_2O_5$.[51] [40] The β-$Ag_{0.33}V_2O_5$ nanowires were first synthesized via a hydrothermal reaction between $V_2O_5$ and AgCOOCH$_3$ in a 3:1 molar ratio (69.6% water volume loading, 14.36 mg/mL solid $V_2O_5$ loading) in a polytetrafluoroethylene-lined sealed stainless steel autoclave for 72 h at 210° C. These nanowires (300 mg) were treated hydrothermally at a temperature of 210° C. with stoichiometric amounts of HCl (69.6% volume loading with 0.5825 M HCl) in water (ρ=18 μΩcm$^{-1}$) for 24 h, resulting in the formation of the topochemically leached ζ-$V_2O_5$ polymorph and insoluble AgCl impurity in a 3:1 molar ratio. The powder X-ray diffraction (XRD) pattern of the products obtained from the topochemical leaching process are depicted in FIG. 8. To eliminate AgCl, the ζ-$V_2O_5$ nanowires were washed with a 5 wt. % aqueous solution of $Na_2S_2O_3$, which forms a water-soluble complex with AgCl(s). Care was taken to wash with copious amounts of water to remove residual acid prior to washing with $Na_2S_2O_3$ to avoid the formation of $SO_2$ (g) and the precipitation of a colloidal sulfur impurity $(S_8)$[52] The resulting orange-brown powder was finally washed with copious amounts of water and was recovered by filtration.

Subsequent topochemical insertion of Mg into pristine ζ-$V_2O_5$ was achieved by two separate routes. First, aqueous magnesiation (Eq. 4) was performed by reacting ζ-$V_2O_5$ with stoichiometric amounts of Mg nanoparticles[53] in water at ambient temperature and pressure for 24 h with constant stirring. The Mg nanoparticles used in this reaction were obtained from the electroless reduction of $CH_3MgCl$ by lithium naphthalide in an anhydrous tetrahydrofuran solution.[53,54] The solid product resulting from reaction between ζ-$V_2O_5$ and Mg nanoparticles was obtained as a dark-green powder, washed with copious amounts of water and 2-propanol, allowed to dry, and finally stored in a glovebox to minimize the formation of a hydrated phase prior to subsequent characterization. A non-aqueous magnesiation route was also developed wherein the ζ-$V_2O_5$ nanowires (typically 200 mg) were mixed with a stoichiometric excess of di-n-butylmagnesium (1:2 molar ratio) in 50 mL heptane. The reaction mixture was allowed to reflux with gentle stirring at 100° C. for 48 h under an Ar atmosphere in order to avoid the formation of MgO. The resulting green powder was washed with copious amounts of hexanes, 2-propanol, and ethanol, and allowed to dry overnight. The magnesiated product is oxidized within about a week under ambient conditions and must be sealed under Ar for long-term storage.

Finally, topochemical leaching of Mg-ions from the magnesiated phases was accomplished by reacting the β-$Mg_xV_2O_5$ nanowires with an excess of NOBF$_4$ (Eq. 3) Precisein dry acetonitrile at a concentration of 0.035 M for 12 h, accompanied by gentle stirring.[55] The resulting powder was washed with acetonitrile, ethanol, acetone, and water. Stoichiometric ratios, reaction conditions, and product handling for the reactions mentioned above and in Eq. 1-4 are described herein.

Example 8

Structural Characterization

High-resolution Synchrotron Diffraction. High-resolution powder XRD for the topochemically leached ζ-$V_2O_5$ and for β-$Mg_xV_2O_5$ were obtained by packing the powders into a poly-oxydiphenylene-pyromellitimide capilliary and measured in transmission geometry at 295K at beamline 11-BM of the Advanced Photon Source at Argonne National Laboratory (λ=0.4136860). Rietveld refinement of the collected data was performed using the GSAS/EXPGUI software suite.[56] Unit cell parameters, atom positions, thermal parameters, and site occupancies were refined and are listed in Table S1. All structural images depicted were generated using the VESTA software suite.[57] Details of the data collection and refinement are provided in the supporting information. Powder XRD data for ζ-$V_2O_5$ before magnesiation, after magnesiation with di-n-butylmagnesium, and after topchemical leaching with NOBF$_4$ were collected in Bragg-Brentano geometry on a short-arm Bruker D8-Focus diffractometer (Cu Kα: λ=1.5418 Å source, 40 kV voltage, 25 mA current) equipped with a Lynxeye detector.

Scanning Electron Microscopy. SEM was performed on a JEOL JSM-7500F FE-SEM equipped with an Oxford EDS spectrometer for elemental characterization at an accelerating voltage of 20 kV. Powders were spread onto carbon tape prior to imaging.

Transmission Electron Microscopy. TEM images and electron diffraction patterns were acquired using a JEOL JEM 3010 operated at 300 keV. The STEM images, EELS and EDX data were acquired with a probe-side aberration-corrected JEOL JEM ARM200CF with a cold field emission gun operated at 200 keV. Details for the STEM, EELS, and EDX conditions are provided in the supporting information.

For both imaging and EELS, probe convergence semi angle of 28 mrad was used with a probe current of 19 pA and probe size of 0.78 Å. The EELS spectrometer collection angle was 45 mrad and the dispersion was set to 0.1 eV/channel. Due to the beam sensitive nature of this ζ-$V_2O_5$ sample, the emission current ($I_E$) was lowered to 7 μA (usual acquisition conditions $I_E$=15 μA) during imaging, EELS and EDX analysis.

Example 9

X-Ray Absorption Spectroscopy and Microscopy

Scanning transmission X-ray microscopy (STXM) measurements. STXM measurements were performed at the SM (10-ID1) beamline of the Canadian Light Source (CLS), a 2.9 GeV third-generation synchrotron facility. Right circularly polarized X-rays, generated by an elliptically polarized undulator (EPU), were used in the experiments. A 25 nm outermost-zone zone plate was used to obtain a diffraction-limited spatial resolution better than 30 nm. A 500 line mm$^{-1}$ plane grating monochromator (PGM) was used to acquire the V L-edge and O K-edge spectral stacks. The incident photon flux (L) count rate was optimized to ca. 17 MHz as read by the STXM detector within a hole located in proximity of the sample of interest and measured at 560 eV by adjusting the exit slits to 20/20 μm (dispersive/non-dispersive). The V L- and the O K-edge stacks were acquired in the energy range from 508-560 eV with energy steps of 0.2 eV in the region of interest and with energy steps 1 eV in the continuum region beyond the specific elemental edges with a uniform dwell time of 1 ms for each spectral section. All STXM data were analyzed and processed using aXis2000 (unicorn.mcmaster.ca/aXis2000.html). The spectra obtained in FIG. 4 were obtained by integrating the individual spectra obtained for each pixel across the entire nanowire.

Mg K-edge measurements. Ensemble Mg K-edge X-ray absorption near-edge structure (XANES) spectra were collected in the energy range between 1290-1350 eV at the resonant elastic and inelastic X-ray scattering (REIXS) beamline (10ID-2) using the X-ray emission spectroscopy end-station at the Canadian Light Source (CLS). Monochromatic soft X-rays were sourced from an undulator and grating monochromator. XAS measurements were acquired in total electron yield (TEY) mode. The absolute energy of the collected XAS spectra were calibrated using reference spectra acquired for MgO, which has a pronounced resonance at 1303 eV.[S8]

Vanadium K-edge measurements. Vanadium K-edge X-ray absorption near-edge structure (XANES) spectra were collected at the Advanced Light Source (ALS) bending magnet beamline 10.3.2 (2.1-17 keV) with the storage ring operating at 500 mA and 1.9 GeV.[S9] V K-edge extended XANES spectra were recorded in transmission mode, by continuously scanning the Si (111) monochromator (Quick XAS mode) from 5355 to 5765 eV, using a beam spot size of 12 μm×3 μm. Spectra were calibrated using a V foil (1$^{st}$ derivative peak set at 5463.76 eV). LabVIEW custom software available at the beamline was used to perform dead-time correction, energy calibration, and glitch removal. The Athena software[S10, S11] (IFEFFIT Demeter package) was used to pre-edge background subtract and post-edge normalize the XANES spectra.[S12]

Example 10

Electrochemical Cycling of ζ-$V_2O_5$

Preparation of electrodes and electrolyte. The ζ-$V_2O_5$ powder was first thoroughly mixed with acetylene black as a conductive agent using a mortar and pestle. Next, a solution of polymeric binder was added to the mortar and further mixed to obtain a slurry. The binder solution was 6 wt. % polyvinylidene fluoride (PVDF, Solvay) dissolved in 1-methyl-2-pyrrolidinone (NMP, Sigma Aldrich, >99%) solvent. The mass ratio of active material, conductive agent, and polymeric binder was adjusted to 6:2:2. The slurry was coated on aluminum foil substrates, followed by drying under an IR-lamp for 30 min and in a vacuum oven at 80° C. overnight. The surface area of the cathodes was 1.27 cm$^2$ with a mass loading of ca. 1.6 mg. The electrolyte was prepared by mixing 0.2 M Magnesium bis(trifluoromethylsulfonyl)imide or Mg(TFSI)$_2$ (Solvionic, 99.5% dried at 150° C. in a vacuum oven) salt and propylene carbonate (PC, Sigma-Aldrich, 99.7%, <20 ppm $H_2O$) as the solvent under stirring to form a homogeneous solution. All the processes were performed within argon-filled gloveboxes (held at <0.1 ppm $H_2O$). PC was chosen as the solvent due to compatibility with oxide cathodes. Since the incompatibility of PC with Mg metal is well documented, activated carbon was used as the counterelectrode in the current experimental setup.

Fabrication and test of electrochemical cells. Activated carbon cloth (ACC-5092-20, Kynol Co.) with mass of 29.3 mg and area of 2 cm$^2$ was used as the anode for the electrochemical cells. The activated carbon cloth (ACC) was dried under vacuum at 80° C. overnight. The high specific surface area of ACC (ca. 2000 m$^2$ g$^{-1}$) gives rise to sufficient double-layer charging within the electrolyte's voltage stability window to match the charge for the cycling of the cathodes. Coin-type cells were fabricated by stacking the cathode and anode separated by glass fiber (VWR, grade 691, 210 μm thick) soaked with the electrolyte. A multi-channel potentiostat (VMP3, Bio-Logic) was used for the electrochemical tests. The potential of the cathode was calibrated by considering the AC anode's potential, which is originally 2.2 V vs Mg/Mg$^{2+}$ and linearly proportional to the state-of-charge. An oven with forced-convection (BINDER) was used to fix the temperature of the cells to 50° C.

Table 1. Atom positions, fractional occupancies and thermal parameters obtained from refinement of the chemically-magnesiated β-$Mg_{0.33}V_2O_5$ structure. Refinement statistics and lattice parameters are included in the table header.

TABLE 1

Atom positions, fractional occupancies and thermal parameters obtained from refinement of the chemically-magnesiated β-$Mg_{0.33}V_2O_5$ structure. Refinement statistics and lattice parameters are included in the table header.
a = 15.33627(17) Å, β = 3.61187(14) Å, c = 10.083053(59) Å,
α = 90°, β = 109.762(1)°; γ = 90°; Volume = 525.633(7) Å$^3$;
$\chi^2$ = 6.408; Rwp = 0.1443; Rw = 11.18%

| Atom Label | x | y | z | Uiso*100 | Occupancy |
|---|---|---|---|---|---|
| Mg(1) | 0.9955(5) | 0.0000000(0) | 0.4033(5) | — | 0.497(0) |
| V(1) | 0.11528(9) | 0.0000000(0) | 0.11528(12) | 0.148 | 1.000(0) |
| V(2) | 0.33885(9) | 0.0000000(0) | 0.10256(12) | 0.455 | 1.000(0) |
| V(3) | 0.28903(10) | 0.0000000(0) | 0.41222(13) | 0.465 | 1.000(0) |
| O(1) | 0.0000000(0) | 0.0000000(0) | 0.0000000(0) | 0.231 | 1.000(0) |
| O(2) | 0.10791(29) | 0.0000000(0) | 0.2741(4) | 0.034 | 1.000(0) |
| O(3) | 0.12977(32) | 0.5000000(0) | 0.0768(4) | 0.034 | 1.000(0) |
| O(4) | 0.25492(30) | 0.0000000(0) | 0.2161(4) | 0.03 | 1.000(0) |

TABLE 1-continued

Atom positions, fractional occupancies and thermal parameters obtained from refinement of the chemically-magnesiated β-Mg$_{0.33}$V$_2$O$_5$ structure. Refinement statistics and lattice parameters are included in the table header.
a = 15.33627(17) Å, β = 3.61187(14) Å, c = 10.083053(59) Å, α = 90°, β = 109.762(1)°; γ = 90°; Volume = 525.633(7) Å$^3$; $\chi^2$ = 6.408; Rwp = 0.1443; Rw = 11.18%

| Atom Label | x | y | z | Uiso*100 | Occupancy |
|---|---|---|---|---|---|
| O(5) | 0.43889(31) | 0.0000000(0) | 0.2161(4) | 0.0357 | 1.000(0) |
| O(6) | 0.31581(28) | 0.5000000(0) | 0.0545(4) | 0.034 | 1.000(0) |
| O(7) | 0.39528(32) | 0.0000000(0) | 0.4712(4) | 1.085 | 1.000(0) |
| O(8) | 0.25594(30) | 0.5000000(0) | 0.4223(4) | 0.064 | 1.000(0) |
| Ag1 | 0.9958160(0) | 0.0000000(0) | 0.4035260(0) | — | 0.091(0) |

Table 2. Bond lengths for the refined chemically-magnesiated β-Mg$_{0.33}$V$_2$O$_5$ structure.

TABLE 2

Bond lengths for the refined chemically-magnesiated β-Mg$_{0.33}$V$_2$O$_5$ structure. Coordination Polyhedra Bond Lengths

| | Vector | Bond Length | | Vector | Bond Length |
|---|---|---|---|---|---|
| [MgO$_5$] square pyramid | Mg(1)-O(2) | 2.487(5) | V(2) octahedron | V(2)-O(3) | 2.023(4) |
| | Mg(1)-O(5) | 2.543(5) | | V(2)-O(4) | 1.991(4) |
| | Mg(1)-O(5) | 2.543(5) | | V(2)-O(5) | 1.574(4) |
| | Mg(1)-O(7) | 2.497(6) | | V(2)-O(6) | 1.8723(10) |
| | Mg(1)-O(7) | 2.497(6) | | V(2)-O(6) | 1.8723(10) |

TABLE 2-continued

Bond lengths for the refined chemically-magnesiated β-Mg$_{0.33}$V$_2$O$_5$ structure. Coordination Polyhedra Bond Lengths

| | Vector | Bond Length | | Vector | Bond Length |
|---|---|---|---|---|---|
| V(1) octahedron | V(1)-O(1) | 1.7570(13) | | V(2)-O(6) | 2.365(4) |
| | V(1)-O(2) | 1.643(4) | V(3) square pyramid | V(3)-O(4) | 1.867(4) |
| | V(1)-O(3) | 1.8760(11) | | V(3)-O(7) | 1.534(4) |
| | V(1)-O(3) | 1.8760(11) | | V(3)-O(8) | 1.8879(13) |
| | V(1)-O(4) | 2.037(5) | | V(3)-O(8) | 1.8879(13) |
| | V(1)-O(6) | 2.296(4) | | V(3)-O(8) | 2.010(4) |

Table 3. The relative formation energies of bi-polarons centered on various vanadium atoms with respect to the bi-polaron centered on V1 and V3. The position of the polarons is with reference to FIG. 16 above.

TABLE 3

The relative formation energies of bi-polarons centered on various vanadium atoms with respect to the bi-polaron centered on V1 and V3. The position of the polarons is with reference to FIG.16 above.

| Polaron's position | Formation energy (eV) |
|---|---|
| V13 | 0.00 |
| V23 | 0.02 |
| V12 | 0.39 |
| V25 | 0.12 |
| V34 | 0.42 |
| V35 | 0.14 |

Table 4. Tabulated metrics for Mg-ion cathode materials reported within the literature.

TABLE 4

Tabulated metrics for Mg-ion cathode materials reported within the literature.

| Material | Capacity (1$^{st}$ cycle) (mAh/g) | Cycle Stability (# cycles) | Capacity n$^{th}$ (mAh/g) | Reported Voltage (V) | Voltage Hysteresis (V) | Coulombic Efficiency | Temp (°C.) | Morphology | Ref. |
|---|---|---|---|---|---|---|---|---|---|
| Mg$_x$Mo$_6$S$_8$ | 70 | >2000 | ~60 | 1.1 (Discharge) | ~0.3 | N/A | −20 to 80° C. | Bulk | (1) |
| α-V$_2$O$_5$ (dry) | ~80 | >10 | ~75 | ~2.4 | N/A | N/A | r.t. | Bulk | (2) |
| α-V$_2$O$_5$ (wet) | ~260 | >10 | N/A | ~2.4 | N/A | N/A | r.t. | Bulk | (2) |
| α-V$_2$O$_5$ (dry) | 10 | 10 | 40 | ~2.2 (average) | 2.5 | N/A | N/A | Bulk | (3) |
| Xerogel V$_2$O$_5$ | 23 | 10 | 47 | 1.9 (average) | ~2.2 | N/A | r.t. | Not specified | (4) |
| ζ-V$_2$O$_5$ (this work) | 148 | >100 | 90 | 1.65 | ~2.0 | 84.2% @ 100$^{th}$ cycle | 50° C. | Nanowires (150 nm width) | This work |

(S1) Aurbach et. al. Nature, 2000, 407(6805) 724-727.[13]

(S2) Sa et. al. Journal of Power Sources. 2016, 323, 44-50.[14]

(S3) Mukherjee et. al. Chemistry of Materials. 2017, 29, 2218-2226.[15]

(S4) Sa et. al. Chemistry of Materials, 2016, 28(9), 2962-2969.[16]

(S5) Kim et. al. Advanced Materials. 2015, 27, 3377-3384.[17]

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and methods and in the steps or in the sequence of steps of the methods described herein without departing from the concept, spirit and scope of the disclosure. More specifically, it will be apparent that certain agents which are both chemically related may be substituted for the agents described herein while the same or similar results would be achieved. All such similar substitutes and modifications apparent to those skilled in the art are deemed to be within the spirit, scope and concept of the disclosure as defined by the appended claims.

REFERENCES

1. Noorden, R. Van The rechargeable revolution: A better battery. *Nature.* 2014; 507: 26-28
2. Nitta, N., Wu, F., Lee, J. T., and Yushin, G. Li-ion battery materials: Present and future. *Mater. Today.* 2015; 18: 252-264
3. Park, Y.-U., Seo, D.-H., Kim, B., Hong, K.-P., Kim, H., Lee, S., Shakoor, R. a, Miyasaka, K., Tarascon, J.-M., and Kang, K. Tailoring a fluorophosphate as a novel 4 V cathode for lithium-ion batteries. *Sci. Rep.* 2012; 2: 704
4. Tarascon, J., Poizot, P., Laruelle, S., Grugeon, S., and Dupont, L. Nano-sized transition-metal oxides as negative-electrode materials for lithium-ion batteries. *Nature.* 2000; 407: 496-499
5. Horrocks, G. A., Likely, M. F., Velazquez, J. M., and Banerjee, S. Finite size effects on the structural progression induced by lithiation of V2O5: a combined diffraction and Raman spectroscopy study. *J. Mater. Chem. A.* 2013; 1: 15265-15277
6. Yoo, H. D., Shterenberg, I., Gofer, Y., Gershinsky, G., Pour, N., and Aurbach, D. Mg rechargeable batteries: an on-going challenge. *Energy Environ. Sci.* 2013; 6: 2265-2279
7. Liu, M., Rong, Z., Malik, R., Canepa, P., Jain, A., Ceder, G., Persson, K. A., and Liu, M. Spinel compounds as multivalent battery cathodes: a systematic evaluation based on ab initio calculations. *Energy Environ. Sci.* 2015; 8: 964-974
8. Besenhard, J. O., and Winter, M. Advances in battery technology: Rechargeable magnesium batteries and novel negative-electrode materials for lithium ion batteries. *ChemPhysChem.* 2002; 3: 155-159
9. Kesler, S. E., Gruber, P. W., Medina, P. A., Keoleian, G. A., Everson, M. P., and Wallington, T. J. Global lithium resources: Relative importance of pegmatite, brine and other deposits. *Ore Geol. Rev.* 2012; 48: 55-69
10. Barbier, E. B. Protect the deep sea. *Nature.* 2014; 505: 475-477
11. DeWitt, S., Hahn, N., Zavadil, K., and Thornton, K. Computational examination of orientation-dependent morphological evolution during the electrodeposition and electrodissolution of magnesium. *J. Electrochem. Soc.* 2016; 163: A513-A521
12. Jackie, M., and Groβ, A. Microscopic properties of lithium, sodium, and magnesium battery anode materials related to possible dendrite growth. *J. Chem. Phys.* 2014; 141: 174710
13. Novak, P., Imhof, R., and Haas, O. Magnesium isertion electrodes for rechargeable nonaqueous batteries—a competitive alternative to lithium? *Electrochim. Acta.* 1999; 45: 351-367
14. Lu, Z., Schechter, A., Moshkovich, M., and Aurbach, D. On the electrochemical behavior of magnesium electrodes in polar aprotic electrolyte solutions. *J. Electroanal. Chem.* 1999; 466: 203-217
15. Aurbach, D., Suresh, G. S., Levi, E., Mitelman, A., Mizrahi, O., Chusid, O., and Brunelli, M. Progress in rechargeable magnesium battery technology. *Adv. Mater.* 2007; 19: 4260-4267
16. Parija, A., Liang, Y., Andrews, J. L., De Jesus, L. R., Prendergast, D., and Banerjee, S. Topochemically de-intercalated phases of $V_2O_5$ as cathode materials for multivalent intercalation batteries: A first-principles evaluation. *Chem. Mater.* 2016; 28: 5611-5620
17. Cabello, M., Nacimiento, F., Gonzalez, J. R., Ortiz, G., Alcantara, R., Lavela, P., Perez-Vicente, C., and Tirado, J. L. Advancing towards a veritable calcium-ion battery: $CaCo_2O_4$ positive electrode material. *Electrochem. commun.* 2016; 67: 59-64
18. Lipson, A. L., Pan, B., Lapidus, S. H., Liao, C., Vaughey, J. T., and Ingram, B. J. Rechargeable Ca-Ion Batteries: A New Energy Storage System. *Chem. Mater.* 2015; 27: 8442-8447
19. Wang, W., Jiang, B., Xiong, W., Sun, H., Lin, Z., Hu, L., Tu, J., Hou, J., Zhu, H., and Jiao, S. A new cathode material for super-valent battery based on aluminium ion intercalation and deintercalation. *Sci. Rep.* 2013; 3: 3383
20. Whittingham, M. S. The Role of Ternary Phases in Cathode Reactions. *J. Electrochem. Soc.* 1976; 123: 315-320
21. Tepavcevic, S., Liu, Y., Zhou, D., Lai, B., Maser, J., Zuo, X., Chan, H., Kral, P., Johnson, C. S., Stamenkovic, V., Markovic, N. M., and Rajh, T. Nanostructured layered cathode for rechargeable Mg-ion batteries. *ACS Nano.* 2015; 9: 8194-8205
22. Mukherjee, A., Sa, N., Phillips, P. J., Burrell, A., Vaughey, J., and Klie, R. F. Direct investigation of Mg intercalation into orthorhombic V2O5 cathode using atomic resolution transmission electron microscopy. *Chem. Mater.* 2017; 29: 2218-2226
23. Gershinsky, G., Yoo, H. D., Gofer, Y., and Aurbach, D. Electrochemical and spectroscopic analysis of $Mg^{2+}$ intercalation into thin film electrodes of layered oxides: $V_2O_5$ and $MoO_3$. *Langmuir.* 2013; 29: 10964-10972
24. Sa, N., Wang, H., Proffit, D. L., Lipson, A. L., Key, B., Liu, M., Feng, Z., Fister, T. T., Ren, Y., Sun, C. J., Vaughey, J. T., Fenter, P. A., Persson, K. A., and Burrell, A. K. Is alpha-$V_2O_5$ a cathode material for Mg insertion batteries? *J. Power Sources.* 2016; 323: 44-50
25. Tepavcevic, S., Xiong, H., Stamenkovic, V. R., Zuo, X., Balasubramanian, M., Prakapenka, V. B., Johnson, C. S., and Rajh, T. Nanostructured bilayered vanadium oxide electrodes for rechargeable sodium-ion batteries. *ACS Nano.* 2012; 6: 530-538
26. Sa, N., Kinnibrugh, T. L., Wang, H., Sai Gautam, G., Chapman, K. W., Vaughey, J. T., Key, B., Fister, T. T., Freeland, J. W., Proffit, D. L., Chupas, P. J., Ceder, G., Bareno, J. G., Bloom, I. D., and Burrell, A. K. Structural evolution of reversible Mg insertion into a bilayer structure of $V_2O_5 \cdot mH_2O$ xerogel material. *Chem. Mater.* 2016; 28: 2962-2969
27. Petkov, V., Trikalitis, P. N., Bozin, E. S., Billinge, S. J. L., Vogt, T., and Kanatzidis, M. G. Structure of $V_2O_5 \cdot nH_2O$ xerogel solved by the atomic pair distribution function technique. *J. Am. Chem. Soc.* 2002; 124: 10157-10162

28. Galy, J., Darriet, J., and Hagenmuller, P. The $Li_xV_2O_5$ bronzes: Structure of the β' and refinement of the γ phase. *Rev. Chim. Miner.* 1971; 8: 509-522

29. Cocciantelli, J. M., Gravereau, P., Doumerc, J. P., Pouchard, M., and Hagenmuller, P. On the preparation and characterization of a new polymorph of $V_2O_5$. *J. Solid State Chem.* 1991; 93: 497-502

30. Parija, A., Prendergast, D., and Banerjee, S. Evaluation of multivalent cation insertion in single- and double-layered polymorphs of $V_2O_5$. *ACS Appl. Mater. Interfaces.* 2017; 9: 23756-23765

31. Arroyo y de Dompablo, M. E., Gallardo-Amores, J. M., Amador, U., and Moran, E. Are high pressure materials suitable for electrochemical applications? HP—$V_2O_5$ as a novel electrode material for Li batteries. *Electrochem. commun.* 2007; 9: 1305-1310

32. Vadym V. Kulish, and Manzhos, S. Comparison of Li, Na, Mg and Al-ion insertion in vanadium pentoxides and vanadium dioxides. *RSC Adv.* 2017; 7: 18643-18649

33. Sun, X., Duffort, V., Mehdi, B. L., Browning, N. D., and Nazar, L. F. Investigation of the mechanism of Mg insertion in nonaqueous and aqueous rechargeable Mg-ion batteries. *Chem. Mater.* 2016; 28: 534-542

34. Kim, C., Phillips, P. J., Key, B., Yi, T., Nordlund, D., Yu, Y. S., Bayliss, R. D., Han, S. D., He, M., Zhang, Z., Burrell, A. K., Klie, R. F., and Cabana, J. Direct observation of reversible magnesium ion intercalation into a spinel oxide host. *Adv. Mater.* 2015; 27: 3377-3384

35. Incorvati, J. T., Wan, L. F., Key, B., Zhou, D., Liao, C., Fuoco, L., Holland, M., Wang, H., Prendergast, D., Poeppelmeier, K. R., and Vaughey, J. T. Reversible magnesium intercalation into a layered oxyfluoride cathode. *Chem. Mater.* 2016; 28: 17-20

36. Gautam, G. S., Canepa, P., Abdellahi, A., Urban, A., Malik, R., and Ceder, G. The intercalation phase diagram of Mg in $V_2O_5$ from first-principles. *Chem. Mater.* 2015; 27: 3733-3742

37. Orikasa, Y., Masese, T., Koyama, Y., Mori, T., Hattori, M., Yamamoto, K., Okado, T., Huang, Z.-D., Minato, T., Tassel, C., Kim, J., Kobayashi, Y., Abe, T., Kageyama, H., and Uchimoto, Y. High energy density rechargeable magnesium battery using earth-abundant and non-toxic elements. *Sci. Rep.* 2014; 4: 5622

38. Liang, Y., Feng, R., Yang, S., Ma, H., Liang, J., and Chen, J. Rechargeable Mg batteries with graphene-like $MoS_2$ cathode and ultrasmall Mg nanoparticle anode. *Adv. Mater.* 2011; 23: 640-643

39. Tao, Z.-L., Xu, L.-N., Gou, X.-L., Chen, J., and Yuan, H.-T. $TiS_2$ nanotubes as the cathode materials of Mg-ion batteries. *Chem. Commun.* 2004; 2080-2081

40. Imamura, D., Miyayama, M., Hibino, M., and Kudo, T. Mg Intercalation properties into $V_2O_5$ gel/carbon composites under high-rate condition. *J. Electrochem. Soc.* 2003; 150: A753

41. De Jesus, L. R., Horrocks, G. A., Liang, Y., Parija, A., Jaye, C., Wangoh, L., Wang, J., Fischer, D. A., Piper, L. F. J., Prendergast, D., and Banerjee, S. Mapping polaronic states and lithiation gradients in individual $V_2O_5$ nanowires. *Nat. Commun.* 2016; 7: 12022

42. De Jesus, L., Zhao, Y., Horrocks, G. A., Andrews, J., Stein, P., Xu, B., and Banerjee, S. Lithiation across Interconnected $V_2O_5$ Nanoparticle Networks. *J. Mater. Chem. A.* 2017; 5: 20141-20152

43. Thole, F., Wan, L. F., and Prendergast, D. Re-examining the Chevrel phase $Mo_6S_8$ cathode for Mg intercalation from an electronic structure perspective. *Phys. Chem. Chem. Phys.* 2015; 17: 22548-22551

44. Wan, L. F., Perdue, B. R., Apblett, C. A., and Prendergast, D. Mg desolvation and intercalation mechanism at the $Mo_6S_8$ Chevrel phase surface. *Chem. Mater.* 2015; 27: 5932-5940

45. Levi, E., Gershinsky, G., Aurbach, D., and Isnard, O. Crystallography of Chevrel phases, MMo6T8 (M=Cd, Na, Mn, and Zn, T=S, Se) and their cation mobility. *Inorg. Chem.* 2009; 48: 8751-8758

46. Liang, Y., Yoo, H. D., Li, Y., Shuai, J., Calderon, H. A., Robles Hernandez, F. C., Grabow, L. C., and Yao, Y. Interlayer-expanded molybdenum disulfide nanocomposites for electrochemical magnesium storage. *Nano Lett.* 2015; 15: 2194-2202

47. Levi, E., Gofer, Y., and Aurbach, D. On the way to rechargeable Mg batteries: The challenge of new cathode materials. *Chem. Mater.* 2010; 22: 860-868

48. Liu, C., Neale, Z. G., and Cao, G. Understanding electrochemical potentials of cathode materials in rechargeable batteries. *Mater. Today.* 2016; 19: 109-123

49. Pereira-Ramos, J. P., Messina, R., and Perichon, J. Electrochemical formation of a magnesium vanadium bronze $Mg_xV_2O_5$ in sulfone-based electrolytes at 150° C. *J. Electroanal. Chem.* 1987; 218: 241-249

50. Millet, P., Satto, C., Sciau, P., and Galy, J. $MgV_2O_5$ and δ-$Li_xV_2O_5$: A comparative structural investigation. *J. Solid State Chem.* 1998; 136: 56-62

51. Gregory, T. D., Hoffman, Ronald, J., and Winterton, R. C. Nonaqueous electrochemistry of magnesium. *J. Electrochem. Soc.* 1990; 137: 775-780

52. Gautam, G. S., Canepa, P., Malik, R., Liu, M., Persson, K., and Ceder, G. First-principles evaluation of multivalent cation insertion into orthorhombic $V_2O_5$. *Chem. Commun.* 2015; 51: 13619-13622

53. Tolhurst, T. M., Leedahl, B., Andrews, J. L., Marley, P. M., Banerjee, S., and Moewes, A. Contrasting 1D tunnel-structured and 2D layered polymorphs of $V_2O_5$: relating crystal structure and bonding to band gaps and electronic structure. *Phys. Chem. Chem. Phys.* 2016; 18: 15798-15806

54. Marley, P. M., Abtew, T. A., Farley, K. E., Horrocks, G. A., Dennis, R. V., Zhang, P., and Banerjee, S. Emptying and filling a tunnel bronze. *Chem. Sci.* 2015; 6: 1712-1718

55. Whittingham, M. S., and Dines, M. B. n-Butyllithium—An effective, general cathode screening agent. *J. Electrochem. Soc.* 1977; 124: 1387-1388

56. Bruce, P. G., Krok, F., Nowinski, J., Gibson, V. C., and Tavakkoli, K. Chemical intercalation of magnesium into solid hosts. *J. Mater. Chem.* 1991; 1: 705-706

57. Viyannalage, L., Lee, V., Dennis, R. V, Kapoor, D., Haines, C. D., and Banerjee, S. From Grignard's reagents to well-defined Mg nanostructures: Distinctive electrochemical and solution reduction routes. *Chem. Commun.* 2012; 48: 5169-5171

58. Galy, J., Darriet, J., Casalot, A., and Goodenough, J. B. Structure of the $MxV_2O_5$,-β and $M_xV_{(2-y)}T_yO_5$-β Phases. *J. Solid State Chem.* 1970; 1: 339-348

59. Wadsley, A. D. The crystal structure of $Na_{2-x}V_6O_{15}$. *Acta Crystallogr.* 1955; 8: 695-701

60. Déramond, E., Savariault, J. M., and Galy, J. Silver insertion mode in β-$Ag_xV_2O_5$ tunnel structure. *Acta Crystallogr.* 1994; C50: 164-166

61. Lee, K. T., Ramesh, T. N., Nan, F., Botton, G., and Nazar, L. F. Topochemical synthesis of sodium metal phosphate olivines for sodium-ion batteries. *Chem. Mater.* 2011; 23: 3593-3600
62. Parent, L. R., Cheng, Y., Sushko, P. V., Shao, Y., Liu, J., Wang, C. M., and Browning, N. D. Realizing the full potential of insertion anodes for Mg-ion batteries through the nanostructuring of Sn. *Nano Lett.* 2015; 15: 1177-1182
63. Aurbach, D., Lu, Z., Schechter, A., Gofer, Y., Gizbar, H., Turgeman, R., Cohen, Y., Moshkovich, M., and Levi, E. Prototype systems for rechargeable magnesium batteries. *Nature.* 2000; 407: 724-727
64. Gyenes, B., Stevens, D. a., Chevrier, V. L., and Dahn, J. R. Understanding anomalous behavior in coulombic efficiency measurements on Li-ion batteries. *J. Electrochem. Soc.* 2015; 162: A278-A283
65. Canepa, P., Sai Gautam, G., Hannah, D. C., Malik, R., Liu, M., Gallagher, K. G., Persson, K. A., and Ceder, G. Odyssey of multivalent cathode materials: Open questions and future challenges. *Chem. Rev.* 2017; 117: 4287-4341
66. Goering, E., Müller, O., Klemm, M., DenBoer, M. L., and Horn, S. Angle dependent soft-X-ray absorption spectroscopy of $V_2O_5$. *Philos. Mag. Part B.* 1997; 75: 229-236
67. Velazquez, J. M., Jaye, C., Fischer, D. a, and Banerjee, S. Near edge X-ray absorption fine structure spectroscopy studies of single-crystalline $V_2O_5$ nanowire arrays. *J. Phys. Chem. C.* 2009; 113: 7639-7645
68. Maganas, D., Roemelt, M., Havecker, M., Trunschke, A., Knop-Gericke, A., Schlögl, R., and Neese, F. First principles calculations of the structure and V L-edge X-ray absorption spectra of $V_2O_5$ using local pair natural orbital coupled cluster theory and spin-orbit coupled configuration interaction approaches. Phys. Chem. Chem. Phys. 2013; 15: 7260-76
69. Horrocks, G. A., Braham, E. J., Liang, Y., De Jesus, L. R., Jude, J., Velazquez, J. M., Prendergast, D., Banerjee, S., Velazquez, J. M., Prendergast, D., and Banerjee, S. Vanadium K-edge X-ray absorption spectroscopy as a probe of the heterogeneous lithiation of $V_2O_5$: first-principles modeling and principal component analysis. *J. Phys. Chem. C.* 2016; 120: 23922-23932
70. Marley, P. M., Horrocks, G. A., Pelcher, K. E., and Banerjee, S. Transformers: the changing phases of low-dimensional vanadium oxide bronzes. *Chem. Commun.* 2015; 51: 5181-5198
71. Andrews, J. L., De Jesus, L. R., Tolhurst, T. M., Marley, P. M., Moewes, A., and Banerjee, S. Intercalation-induced exfoliation and thickness-modulated electronic structure of a layered ternary vanadium oxide. *Chem. Mater.* 2017; 29: 3285-3294
72. Wan, L. F., and Prendergast, D. The solvation structure of Mg ions in dichloro complex solutions from first-principles molecular dynamics and simulated X-ray absorption spectra. *J. Am. Chem. Soc.* 2014; 136: 14456-14464
73. Benmayza, A., Ramanathan, M., Arthur, T. S., Matsui, M., Mizuno, F., Guo, J., Glans, P. A., and Prakash, J. Effect of electrolytic properties of a magnesium organohaloaluminate electrolyte on magnesium deposition. *J. Phys. Chem. C.* 2013; 117: 26881-26888
74. Lin, X. W., Wang, Y. Y., Dravid, V. P., Michalakos, P. M., and Kung, M. C. Valence states and hybridization in vanadium oxide systems investigated by transmission electron-energy-loss spectroscopy. *Phys. Rev. B.* 1993; 47: 3477-3481
75. Ellis, B., Perry, L. K., Ryan, D. H., and Nazar, L. F. Small polaron hopping in $Li_x FePO_4$ solid solutions: Coupled lithium-ion and electron mobility. *J. Am. Chem. Soc.* 2006; 128: 11416-11422
76. Yu, J., Sushko, M. L., Kerisit, S., Rosso, K. M., and Liu, J. Kinetic Monte Carlo study of ambipolar lithium ion and electron-polaron diffusion into nanostructured $TiO_2$. *J. Phys. Chem. Lett.* 2012; 3: 2076-2081
77. Zhang, R., Yu, X., Nam, K. W., Ling, C., Arthur, T. S., Song, W., Knapp, A. M., Ehrlich, S. N., Yang, X. Q., and Matsui, M. $\alpha$-$MnO_2$ as a cathode material for rechargeable Mg batteries. *Electrochem. commun.* 2012; 23: 110-113
78. Toby, B. H. EXPGUI, a graphical user interface for GSAS. *J. Appl. Crystallogr.* 2001; 34: 210-213
79. Momma, K., and Izumi, F. VESTA 3 for three-dimensional visualization of crystal, volumetric and morphology data. *J. Appl. Crystallogr.* 2011; 44: 1272-1276
80. Hohenberg, P., and Kohn, W. Inhomogenous electron gas. *Phys. Rev. B.* 1964; 136: 864-871
81. Kohn, W., and Sham, L. J. Self-consistent equations including exchange and correlation effects. *Phys. Rev.* 1965; 140:
82. Kresse, G., and Furthmüller, J. Efficiency of ab-initio total energy calculations for metals and semiconductors using a plane-wave basis set. *Comput. Mater. Sci.* 1996; 6: 15-50
83. Perdew, J. P., Burke, K., and Ernzerhof, M. Generalized gradient approximation made simple. *Phys. Rev. Lett.* 1996; 77: 3865-3868
84. Wang, Y., Zhou, Q., Li, K., Zhong, Q., and Bui, Q. B. Preparation of Ni—W—$SiO_2$ nanocomposite coating and evaluation of its hardness and corrosion resistance. *Ceram. Int.* 2014; 41: 79-84
S1. Marley, P. M., Abtew, T. A., Farley, K. E., Horrocks, G. A., Dennis, R. V., Zhang, P., and Banerjee, S. Emptying and filling a tunnel bronze. *Chem. Sci.* 2015; 6: 1712-1718
S2. Davis, R. E. Displacement reaction at the sulfur atom. I. An interpretation of the decomposition of acidified thiosulfate. *J. Am. Chem. Soc.* 1958; 80: 3565-3569
S3. Viyannalage, L., Lee, V., Dennis, R. V, Kapoor, D., Haines, C. D., and Banerjee, S. From Grignard's reagents to well-defined Mg nanostructures: Distinctive electrochemical and solution reduction routes. *Chem. Commun.* 2012; 48: 5169-5171
S4. Norberg, N. S., Arthur, T. S., Fredrick, S. J., and Prieto, A. L. Size-dependent hydrogen storage properties of Mg nanocrystals prepared from solution. *J. Am. Chem. Soc.* 2011; 133: 10679-10681
S5. Lee, K. T., Ramesh, T. N., Nan, F., Botton, G., and Nazar, L. F. Topochemical synthesis of sodium metal phosphate olivines for sodium-ion batteries. *Chem. Mater.* 2011; 23: 3593-3600
S6. Toby, B. H. EXPGUI, a graphical user interface for GSAS. *J. Appl. Crystallogr.* 2001; 34: 210-213
S7. Momma, K., and Izumi, F. VESTA 3 for three-dimensional visualization of crystal, volumetric and morphology data. *J. Appl. Crystallogr.* 2011; 44: 1272-1276
S8. Ley, L., McFeely, F. R., Kowalczyk, S. P., Jenkin, J. G., and Shirley, D. A. Many-body effects in X-ray photoemission from magnesium. *Phys. Rev. B* 1975; 11: 600-612
S9. Marcus, M. A., MacDowell, A. A., Celestre, R., Manceau, A., Miller, T., Padmore, H. A., and Sublett, R.

E. Beamline 10.3.2 at ALS: A hard X-ray microprobe for environmental and materials sciences. *J. Synchrotron Radiat.* 2004; 11: 239-247

S10. Newville, M. IFEFFIT: Interactive XAFS analysis and FEFF fitting. *J. Synchrotron Radiat.* 2001; 8: 322-324

S11. Ravel, B., and Newville, M. ATHENA, ARTEMIS, HEPHAESTUS: Data analysis for X-ray absorption spectroscopy using IFEFFIT. *J. Synchrotron Radiat.* 2005; 12: 537-541

S12. Ravel, B., and Newville, M. ATHENA and ARTEMIS: Interactive graphical data analysis using IFEFFIT. *Phys. Scripta.* 2005; T115: 1007-1010

S13. Aurbach, D., Lu, Z., Schechter, A., Gofer, Y., Gizbar, H., Turgeman, R., Cohen, Y., Moshkovich, M., and Levi, E. Prototype systems for rechargeable magnesium batteries. *Nature* 2000; 407: 724-727

S14. Sa, N., Wang, H., Proffit, D. L., Lipson, A. L., Key, B., Liu, M., Feng, Z., Fister, T. T., Ren, Y., Sun, C. J., Vaughey, J. T., Fenter, P. A., Persson, K. A., and Burrell, A. K. Is alpha-$V_2O_5$ a cathode material for Mg insertion batteries? *J. Power Sources* 2016; 323: 44-50

S15. Mukherjee, A., Sa, N., Phillips, P. J., Burrell, A., Vaughey, J., and Klie, R. F. Direct investigation of Mg intercalation into orthorhombic $V_2O_5$ cathode using atomic resolution transmission electron microscopy. *Chem. Mater.* 2017; 29: 2218-2226

S16. Sa, N., Kinnibrugh, T. L., Wang, H., Sai Gautam, G., Chapman, K. W., Vaughey, J. T., Key, B., Fister, T. T., Freeland, J. W., Proffit, D. L., Chupas, P. J., Ceder, G., Bareno, J. G., Bloom, I. D., and Burrell, A. K. Structural evolution of reversible Mg insertion into a bilayer structure of $V_2O_5 \cdot mH_2O$ xerogel material. *Chem. Mater.* 2016; 28: 2962-2969

S17. Kim, C., Phillips, P. J., Key, B., Yi, T., Nordlund, D., Yu, Y. S., Bayliss, R. D., Han, S. D., He, M., Zhang, Z., Burrell, A. K., Klie, R. F., and Cabana, J. Direct observation of reversible magnesium ion intercalation into a spinel oxide host. *Adv. Mater.* 2015; 27: 3377-3384

The invention claimed is:

1. A rechargeable battery comprising an electrode comprising metastable $\zeta$-$V_2O_5$ nanowires, a conductive agent and a polymeric binder coated onto a current collector, said $\zeta$-$V_2O_5$ nanowires exhibiting no evidence of AgCl when analyzed by powder x-ray diffraction.

2. The rechargeable battery of claim 1, wherein the rechargeable battery is a Mg-ion battery or Mg battery.

3. The rechargeable battery of claim 1, further comprising an anode material selected from the group consisting of activated carbon cloth, graphite, Mg metal, a Mg alloy containing Mg, and an intermetallic compound containing Mg.

4. The rechargeable battery of claim 1, said rechargeable battery further comprising one or more ions intercalated into the interstices of said $\zeta$-$V_2O_5$ nanowires.

5. The rechargeable battery of claim 4, wherein said one or more ions are selected from the group consisting of $Li^+$ ions, $Na^+$ ions, $Al^{3+}$ ions, $Y^{3+}$ ions, $Ca^{2+}$ ions, $Mg^{2+}$ ions, $Zn^{2+}$ ions, and combinations thereof.

6. The rechargeable battery of claim 1, said $\zeta$-$V_2O_5$ nanowires having a smallest dimension of about 50 nm to about 1000 nm.

7. The rechargeable battery of claim 1, wherein ion diffusion occurs radially within said $\zeta$-$V_2O_5$ nanowires.

* * * * *

UNITED STATES PATENT AND TRADEMARK OFFICE
CERTIFICATE OF CORRECTION

PATENT NO. : 11,990,613 B2
APPLICATION NO. : 16/956761
DATED : May 21, 2024
INVENTOR(S) : Sarbajit Banerjee et al.

It is certified that error appears in the above-identified patent and that said Letters Patent is hereby corrected as shown below:

In the Specification

Column 2,
Line 13, "electrolytes $^{8,13}$-15" should read --electrolytes$^{8,13\text{-}15}$--.

Column 8,
Line 17, "(1.65 V vs)Mg$^{2+}$/Mg$^O$" should read --(1.65 V vs Mg$^{2+}$/Mg$^0$)--.

Column 15,
Line 44, "(~1.2 V versus) Mg$^{2+}$/Mg$^O$)" should read --(~1.2 V *versus* Mg$^{2+}$/Mg$^0$)--.

Column 16,
Line 38, "α-V$_2$O$_5$.$^{41,53,66}$–68" should read --α-V$_2$O$_5$.$^{41,53,66\text{–}68}$--.

Column 25,
Line 24, "flux (L)" should read --flux (*Io*)--.

Column 26,
Line 55, "α = 15.33627(17) Å, β = 3.61187(14)" should read --a = 15.33627(17) Å, b = 3.61187(14)--.

Column 27,
Line 7, "α = 15.33627(17) Å, β = 3.61187(14)" should read --a = 15.33627(17) Å, b = 3.61187(14)--.

Column 28,
Lines 41-43, "Capacity n$^{th}$ (mAh/g)" should read --Capacity (n$^{th}$ cycle) (mAh/g)--.

Signed and Sealed this
Twenty-eighth Day of October, 2025

John A. Squires
*Director of the United States Patent and Trademark Office*

Page 1 of 1